(12) United States Patent
West et al.

(10) Patent No.: US 8,926,834 B2
(45) Date of Patent: Jan. 6, 2015

(54) PROBE FOR WATER TREATMENT

(75) Inventors: Stephen J. West, Milford, OH (US);
Taylor M. Goon, Rising Sun, IN (US);
Terry Tincher, Lebanon, OH (US)

(73) Assignee: Delaware Capital Formation, Inc.,
Wilmington, DE (US)

( * ) Notice: Subject to any disclaimer, the term of this patent is extended or adjusted under 35 U.S.C. 154(b) by 576 days.

(21) Appl. No.: 12/906,254

(22) Filed: Oct. 18, 2010

(65) Prior Publication Data
US 2012/0091049 A1 Apr. 19, 2012

(51) Int. Cl.
| | |
|---|---|
| *G05D 23/00* | (2006.01) |
| *C02F 1/00* | (2006.01) |
| *G01F 1/698* | (2006.01) |
| *G01F 1/684* | (2006.01) |
| *G01F 1/699* | (2006.01) |
| *G01F 1/692* | (2006.01) |
| *C02F 103/02* | (2006.01) |

(52) U.S. Cl.
CPC .............. *G01F 1/6986* (2013.01); *G01F 1/684* (2013.01); *G01F 1/699* (2013.01); *G01F 1/692* (2013.01); *C02F 1/008* (2013.01); *C02F 2103/023* (2013.01); *C02F 2209/006* (2013.01); *C02F 2209/008* (2013.01); *C02F 2209/04* (2013.01); *C02F 2209/05* (2013.01); *C02F 2209/06* (2013.01); *C02F 2209/22* (2013.01)
USPC ......... 210/87; 210/96.1; 210/149; 73/204.16; 73/204.14; 73/204.22; 73/204.25; 73/866.5

(58) Field of Classification Search
None
See application file for complete search history.

(56) References Cited

U.S. PATENT DOCUMENTS

| | | | | |
|---|---|---|---|---|
| 4,334,186 A | * | 6/1982 | Sasayama et al. | 323/365 |
| 4,480,467 A | * | 11/1984 | Harter et al. | 73/204.15 |
| 4,753,111 A | * | 6/1988 | Caron et al. | 73/204.14 |
| 5,449,017 A | | 9/1995 | Collins et al. | |
| 6,318,168 B1 | * | 11/2001 | Chidley et al. | 73/204.15 |
| 6,658,931 B1 | * | 12/2003 | Plumb et al. | 73/204.15 |
| 6,672,154 B1 | * | 1/2004 | Yamagishi et al. | 73/204.22 |
| 7,624,632 B1 | * | 12/2009 | Hoyle et al. | 73/204.11 |
| 7,775,105 B2 | * | 8/2010 | Khadkikar et al. | 73/290 R |
| 8,000,907 B2 | * | 8/2011 | Zimmermann et al. | 702/45 |
| 2003/0056585 A1 | * | 3/2003 | Furuki et al. | 73/204.19 |

FOREIGN PATENT DOCUMENTS

| | | | |
|---|---|---|---|
| EP | 103150 A1 | * | 3/1984 |
| GB | 1552506 A | * | 9/1979 |

\* cited by examiner

*Primary Examiner* — Terry Cecil
(74) *Attorney, Agent, or Firm* — Wood, Herron & Evans, LLP

(57) ABSTRACT

A water treatment sensor includes a housing having a bottom with an exterior surface in contact with a flow path of a fluid and an interior surface. First and second probes spaced from one another extend from the exterior surface and into the flow path. A first circuit electrically connects the first and second probes and determines a conductivity from a measured resistivity between the probes. First and second temperature sensors are spaced from one another and are coupled to the interior surface. The first sensor determines a temperature of the fluid. A temperature elevated by a heat source and determined by the second sensor is maintained above the temperature of the fluid. A second circuit determines a flow rate of the fluid based on adjustments to the heat source. Communication circuitry communicates the conductivity, the temperature, and the flow rate of the fluid to a controller.

20 Claims, 16 Drawing Sheets

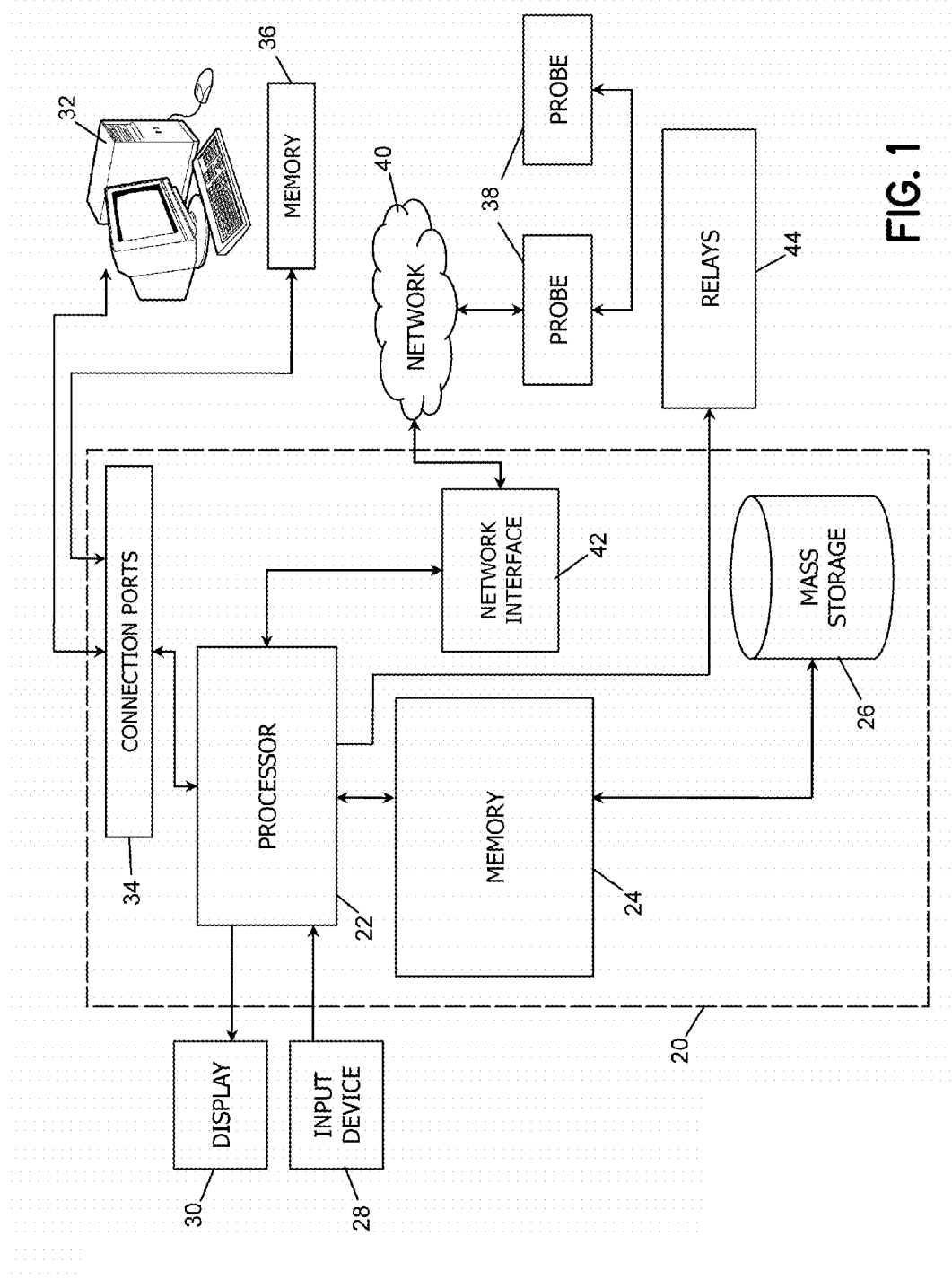

150

148

PROBE FOR WATER TREATMENT

CROSS-REFERENCE TO RELATED APPLICATIONS

This application is related to U.S. patent application Ser. No. 12/906,216 filed on even date herewith by Thomas P. Haller et al., and entitled "CONTROLLER FOR WATER TREATMENT" (HYD-135) and U.S. patent application Ser. No. 12/906,278, filed on even date herewith by Stephen J. West et al., and entitled "COMMUNICATION NETWORK FOR WATER TREATMENT" (HYD-138), the disclosures of which are each incorporated by reference herein in their entireties.

FIELD OF THE INVENTION

The invention relates generally to a system for water treatment and more particularly to probes or sensors used for the treatment of water used in evaporative recirculating cooling systems.

BACKGROUND OF THE INVENTION

Evaporative cooling systems are utilized in such processing equipment as condensers, coils, jackets, as well as other heat exchangers. Evaporative cooling systems operate on the principle that the latent heat of vaporization of water being evaporated removes energy from the system, thus, reducing the temperature of the remaining water in the system. In particular, cooling towers are widely used in industry to transfer process waste heat to the atmosphere. In the interests of economy, the aqueous coolant used in these systems is generally recycled.

In cooling towers, the warmed coolant is generally permitted to flow over a large surface that is subjected to a draft of air, either forced or natural, to bring about evaporation of a portion of the exposed coolant. The remaining coolant, which has given up heat to supply the heat of vaporization of the portion evaporated, flows to a reservoir from which it is pumped back to the processing equipment for the absorption of more heat, thus completing the cycle. During this process the coolant can absorb oxygen from the air which adds to its corrosiveness. Additionally, as some of the coolant is evaporated, the salts and other impurities remaining in the coolant are concentrated. This results in an increased amount of dissolved solids in the recirculating stream.

The most common dissolved salts in domestic water, used as a coolant, are bicarbonates, chlorides, and sulfates of calcium, magnesium, and sodium. When water containing calcium bicarbonate is heated, as in cooling of air conditioning systems or other equipment, the heat will strip off one molecule of carbon dioxide, converting the remaining calcium salt to calcium carbonate (limestone) according to the equation:

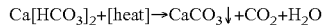

$$Ca[HCO_3]_2 + [heat] \rightarrow CaCO_3 \downarrow + CO_2 + H_2O$$

Typically, various additives such as corrosion inhibitors, anti-fouling agents, and microbiocides are mixed with the water. These additives serve to minimize corrosion of the equipment being served and to maintain the equipment within practical limits of efficiency, by minimizing the formation of scale (such as the calcium carbonated discussed above), sludge deposits and biological growth. Other additives may also include acids, such as sulfuric acid, which may be introduced as required to maintain a desired pH of the coolant, generally between about 6.3 and 7.5. Too low a pH will lead to corrosion, whereas too high a pH in the presence of hard water results in scale and other deposits on the water side of the processing equipment.

In the past, it had frequently been the practice to shut down a cooling system after six to twelve months of operation to clean waterside surfaces of the processing equipment being served. In view of high labor costs and other considerations, the tendency more recently has been to run for longer periods of time, such as 24 to 36 months, before having to shut down. For this reason, scale and other deposits on the waterside surfaces are a major consideration, especially since the presence of appreciable scaling and fouling limits the efficiency of the processing equipment. Where peak efficiency is required, scaling and fouling become of primary concern. Deposits on waterside surfaces mean reduced and frequently uneven heat transfer, poor corrosion inhibitor performance, shortened equipment life, increased pumping costs and product loss due to ineffectual cooling.

Contemporary cooling tower systems tend to concentrate the hardness of the aqueous coolant and other contained undesirable impurities because of the rapid evaporation which is characteristic of all such cooling towers. If no steps were taken to rid the systems of this unwanted material and to limit the degree of hardness of the circulating coolant, the processing equipment would be fouled very rapidly. It would be rendered inefficient, and would require frequent down time for cleaning and actual equipment replacement. In an attempt to overcome these difficulties, a procedure is used known as "blowdown" or "bleed," in which a certain percentage of the recirculating coolant stream is purged from the system, carrying with it a portion of the unwanted scale and deposit-forming impurities. The blowdown is generally based on maintaining a materials balance in the system, so that the scaling and fouling constituents are not sufficiently concentrated to result in deposition on heat transfer surfaces.

The required amount of blowdown can be quite considerable. For example, with a typical, moderately sized unit having a rate of circulation of 5,000 gallons per minute (gpm), the total quantity of blowdown over a 24 hour period can amount to 72,000 gallons, or more than three times the total content of the system. This discarded water represents a very appreciable loss, both monetarily, and as a valuable resource. The blowdown unfortunately also carries with it the contained additives. The loss of water and valuable additives for a moderate sized industrial unit may amount to many thousands of dollars per year of operation.

Therefore, there is a need in the art for a system for maintaining cooling water or other coolant fluids in proper operating conditions, which are consistent with both resource usage and cost of operation.

SUMMARY OF THE INVENTION

A system for water treatment comprising: a controller; a network; a sensor communicating over the network with the controller, the sensor including: a housing having a bottom portion, wherein the bottom portion of the housing includes an exterior surface in contact with a flow path of a fluid and an interior surface; a first probe extending from the exterior surface and into the flow path of the fluid; a second probe extending from the exterior surface and into the flow path of the fluid, the second probe spaced from the first probe; a first circuit electrically connected to the first and second probe and configured to measure a resistivity between the first and second probes and determine a conductivity from the measured resistivity; a first temperature sensor coupled to the interior surface and configured to determine a temperature of the fluid through the bottom portion of the housing; a second temperature sensor coupled to the interior surface and spaced from the first temperature sensor; a heat source proximate the second temperature sensor and configured to elevate a temperature determined by the second temperature sensor, wherein the temperature determined by the second temperature sensor is maintained at a temperature above the determined temperature of the fluid; a second circuit configured to adjust the heat source and determine a flow rate of the fluid based on the adjustment; and communication circuitry configured to communicate the conductivity of the fluid, the temperature of the fluid, and the flow rate of the fluid to the controller.

In an embodiment of the invention, the temperature is determined by the second temperature sensor is maintained at a set difference above the temperature of the fluid. In another embodiment of the invention, the set difference above the temperature of the fluid is approximately 2 degrees. In yet another embodiment of the invention, the second circuit adjusts the heat source by: applying a pulse-width-modulation (PWM) signal to the heat source; in response to a difference in temperature between the temperature of the fluid and the temperature determined by the second temperature sensor being less than the set difference, increasing a number of PWM counts applied to the heat source; and in response to the difference in temperature between the temperature of the fluid and the temperature determined by the second temperature sensor being greater than the set difference, decreasing the number of PWM counts applied to the heat source.

In yet another embodiment of the invention, the second circuit determines the flow rate of the fluid by: correlating the PWM counts applied to the heat source to the flow rate of the fluid; and calculating a flow rate based on the number of PWM counts applied to the heat source. In yet another embodiment of the invention, a FLOW OFF event is determined when the PWM counts applied to the heat source drop below a predetermined threshold, and a FLOW ON event is determined when the PWM counts applied to the heat source exceed a predetermined threshold.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 1 is a schematic block diagram of an architecture of a controller consistent with embodiments of the invention.

Figure 2A:
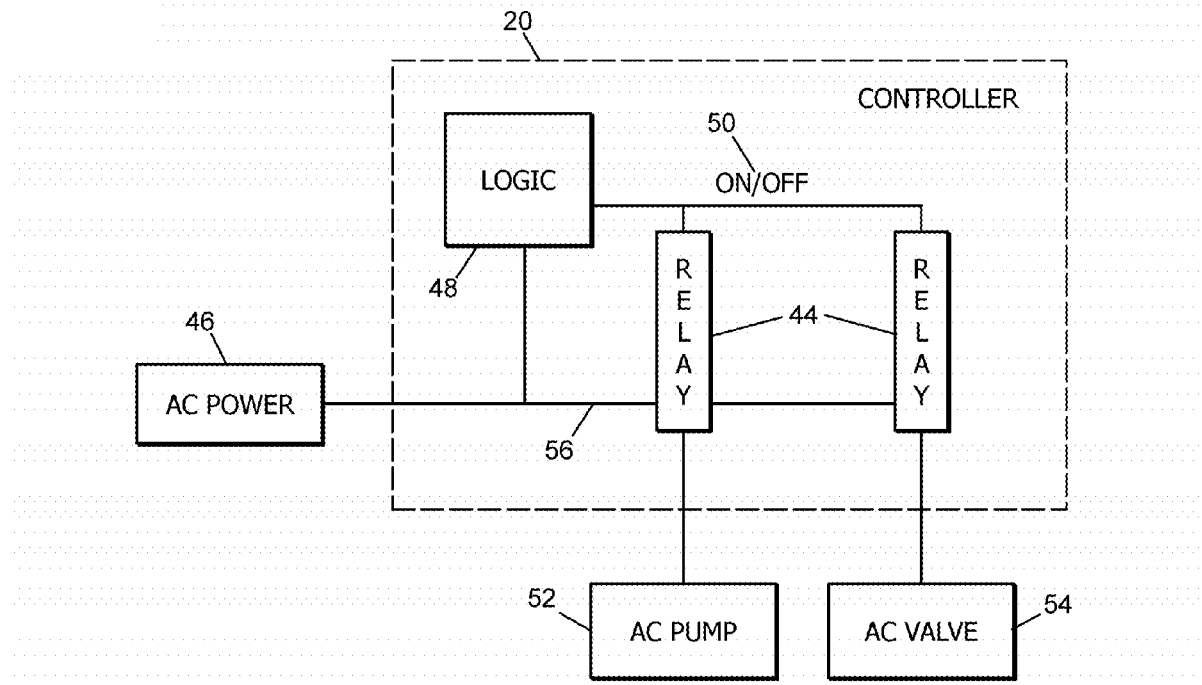
FIG. 2A is a schematic block diagram of a wet operation model of a relay of the controller of FIG. 1.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Embodiments of the invention provide a controller for maintaining cooling water or other fluids in proper operating conditions which are consistent with resource usage and cost of operation. The controller performs two basic operations among its many operations. First, the controller monitors the cooling fluid and drains fluid out of the system when an amount of dissolved solids in the cooling system's fluid is too high. Additionally, the controller has the ability to add fresh water to make up the volume loss from the draining, though in other embodiments, a float switch is used to add water to the system to maintain a proper reservoir level. Second, the controller monitors certain aspects and properties of the cooling fluid and adds various chemicals to the cooling system fluid, which may assist in helping to control scaling, corrosion or to kill microbes.

Turning to the drawings, wherein like numbers denote like parts throughout the several views, FIG. 1 illustrates an exemplary hardware and software environment for a controller 20 suitable for implementing the various functions necessary for maintaining cooling water or other fluids in proper operating conditions consistent with embodiments of the invention. For the purposes of embodiments of the invention, controller 20 may represent practically any computer, computer system, or programmable device e.g., multi-user or single-user computers, desktop computers, portable computers and devices, handheld devices, network devices, mobile phones, etc.

Controller 20 typically includes at least one processor 22 coupled to a memory 24. Processor 22 may represent one or more processors (e.g. microprocessors, ASICs, FPGAs, logic circuits, etc.), and memory 24 may represent the random access memory (RAM) devices comprising the main storage of controller 20, as well as any supplemental levels of memory, e.g., cache memories, non-volatile or backup memories (e.g. programmable or flash memories), read-only memories, etc. In addition, memory 24 may be considered to include memory storage physically located elsewhere in controller 20, e.g., any cache memory in the processor 22, as well as any storage capacity used as a virtual memory, e.g., as stored on a mass storage device 26.

Controller 20 also typically receives a number of inputs and outputs for communicating information externally. For interface with a user or operator 20 typically includes one or more user input devices 28 (e.g., a keyboard, a mouse, a trackball, a joystick, a touchpad, a keypad, a stylus, and/or a microphone, among others). Controller 20 may also include a display 30 (e.g., a CRT monitor, an LCD display panel, LED indicators, and/or a speaker, among others). The interface to controller 20 may also be through an external computer 32 connected directly to connection ports 34 (such as serial, parallel, USB, firewire, etc.). Additional external memory 36 may also be connected directly to connection ports 34. Controller 20 communicates with a number of satellite probe 38 via a digital network 40 through a network interface 42 though in other embodiments, the network interface may be incorporated directly into the processor 22.

Controller 20 operates under the control of software applications, components, programs, objects, modules, etc. which execute on the processor 22. In general, the routines executed to implement the embodiments of the invention will be referred to herein as "computer program code," or simply "program code." Program code typically includes one or more instructions that are resident at various times in various memory 24 and storage devices 26 in controller 20, and that, when read and executed by the processor 22 in the controller 20, cause the controller 20 to perform the steps necessary to execute steps or elements embodying the various aspects of the embodiments of the invention, such as, for example, turning relays 44 on or off. Moreover, while embodiments of the invention have and hereinafter will be described in the context of fully functioning controllers or other computers and computer systems, those of ordinary skill in the art will appreciate that the various embodiments of the invention are capable of being distributed as a program product in a variety of forms, and that the invention applies equally regardless of the particular type of computer readable medium used to actually carry out the distribution. Examples of computer readable medium include, but are not limited to, physical, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

Figure 2B:
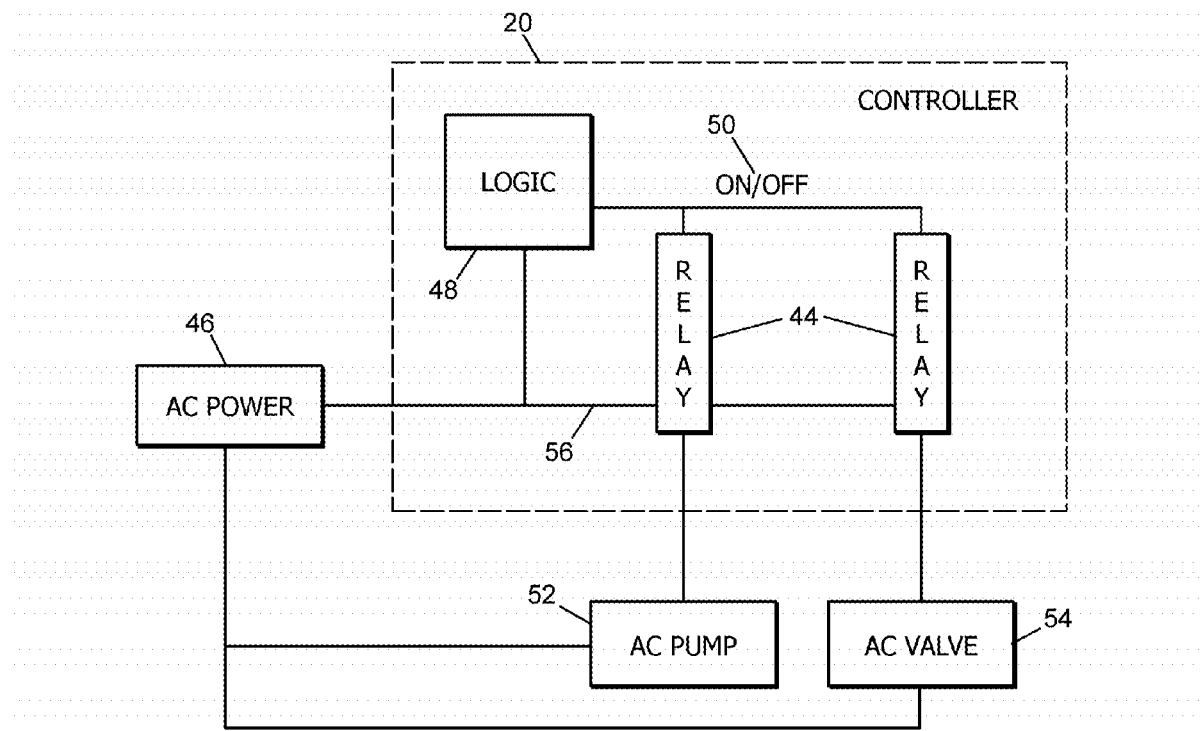
FIG. 2B is a schematic block diagram of a dry operation model of a relay of the controller of FIG. 1.

Turning now to FIGS. 2A and 2B, contemporary water treatment controllers have relay 44 outputs to turn off and on pumps or open and close valves, for example. This circuitry is generally configured in two different models. One model is designed for wet operation. The wet operation model as illustrated in the block diagram in FIG. 2A. AC power 46 is provided to controller 20. Logic circuits 48, which may be processor 22 in some embodiments or in communication with processor 22 in other embodiments, determine an ON/OFF state 50 for each relay. Each relay 44 output supplies the ON or OFF state 50 to peripheral devices such as an AC pump 52 or an AC valve 54. AC power 46 is delivered to the peripheral devices 52, 54 through the power 56 of the controller 20.

The dry operation model is illustrated in the block diagram in FIG. 2B. Similar to the wet model, AC power 46 is provided to controller 20. Logic circuits 48, which may be processor 22 in some embodiments or in communication with processor 22 in other embodiments, determine an ON/OFF state 50 for each relay. Each relay 44 output supplies the ON or OFF state 50 to peripheral devices such as an AC pump 52 or an AC valve 54. However, the dry operation model is defined as switched only and no power is given to the relay 44 contacts/outputs. Rather any AC power 46 required by the peripheral devices 52, 54 may be supplied directly from the AC power 46 or some other power source.

Figure 3A:
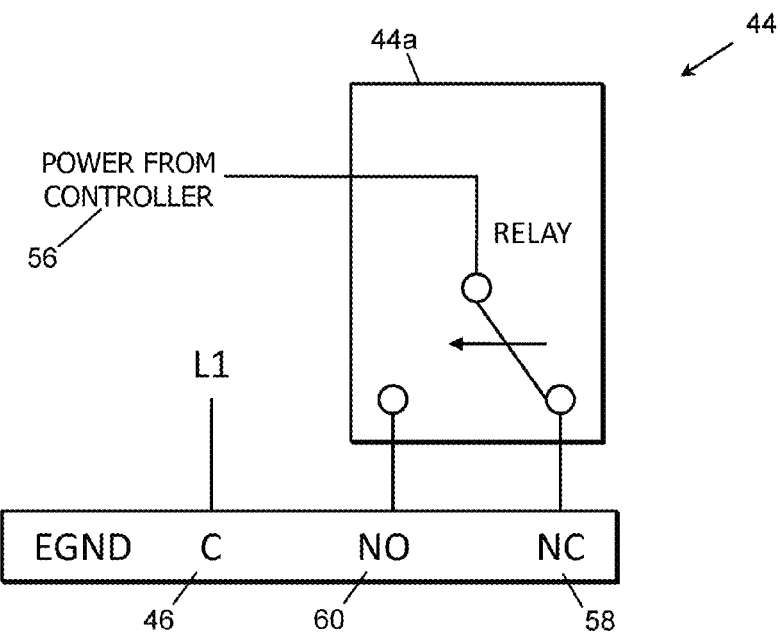
FIG. 3A is a prior art wiring diagram of the wet operation model of FIG. 2A.
Figure 3B:
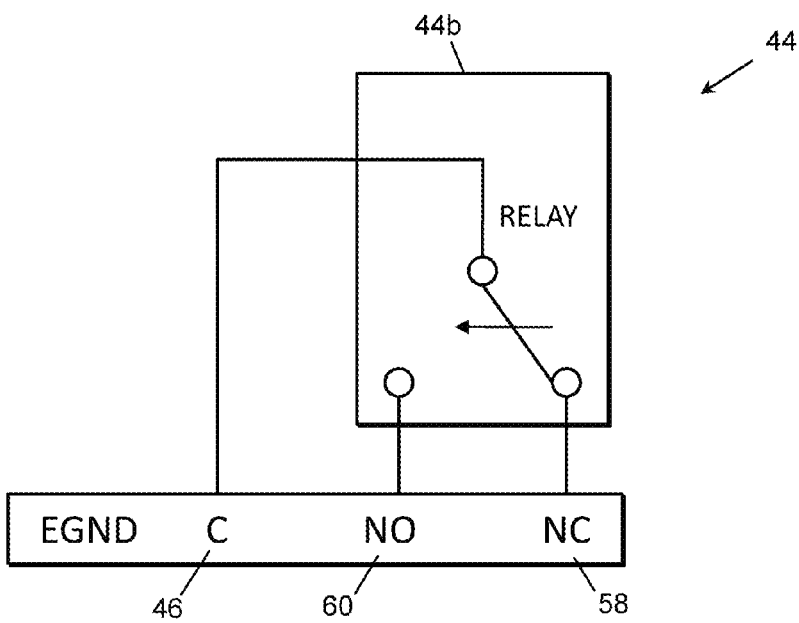
FIG. 3B is a prior are wiring diagram of the dry operation model of FIG. 2B

Relays 44 in contemporary controllers are generally configured as either wet operation or dry operation as seen in the wiring diagrams in FIGS. 3A and 3B. Moreover, these relays 44 may be configured as normally closed (NC) 58 or normally open (NO) 60. FIG. 3A illustrates wet operation with controller power 56 being supplied to the relay 44a which in this figure is wired as normally closed (NC) 58. FIG. 3B illustrates dry operation with the AC power 46 being delivered from an external source 46 to the relay 44b which in this figure is also wired as normally closed (NC) 58. A drawback to using these contemporary configurations of relays 44 is that relay 44 circuit boards for wet operation need to be replaced with circuit boards for dry operation or dry operation circuit boards replaced by wet operation circuit boards. In either situation, the physical hardware of the controller 20 needs to be modified by exchanging relay circuit boards.

Figure 4:
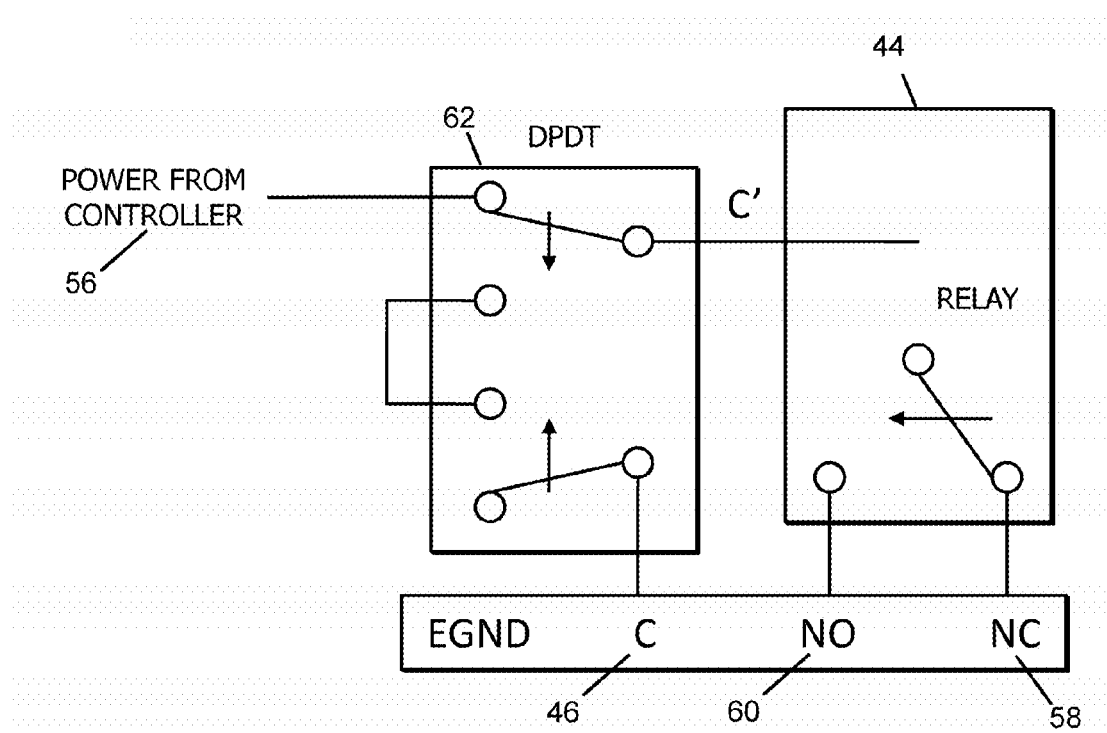
FIG. 4 is a wiring diagram of a configurable wet/dry operation model of the relays in FIG. 1.

Embodiments of the invention address this challenge with the contemporary circuit boards by combining both wet and dry operation for each relay 44, thus eliminating the need to replace hardware when changing from one mode to another. FIG. 4 illustrates a wiring diagram for one embodiment of combined wet/dry configuration. In this embodiment, a double pole, double throw (DPDT) switch 62 is used between the relay 44 and the controller 20. This allows for both wet and dry operation on each relay separately. The DPDT switch 62 configures between wet or dry operation at any time. Thus, any given relay 44 associated with the controller 22 may be configured for wet operation or dry operation and configured as normally open or normally closed. The embodiment in FIG. 4 is configured as normally closed (NC) 58 though, as stated above, other embodiments may be configured as normally open (NO) 60. Other embodiments may also employ other types of switches with the relays to quickly and easily change between wet and dry configurations.

In order to monitor the cooling fluid flow and quality in contemporary water treatment controllers, direct input from probes positioned throughout the system is utilized. However, the circuitry for the probes requires space which ultimately limits the number of inputs available to the controller 20. Additionally, controllers having different numbers of probe input ports ultimately creates multiple part numbers for each of the different configurations, all of which must now be stored in inventory. Thus, another method for communication between the probes and the controller 20 is desirable to overcome this issue. Additionally, although many contemporary probes utilize digital technology, these probes tend to be cost prohibitive generally requiring specialized software to interface to with controllers. Therefore, it is also desirable to develop a communication interface that would be compatible with the digital technologies and at a reasonable cost.

Figure 5:
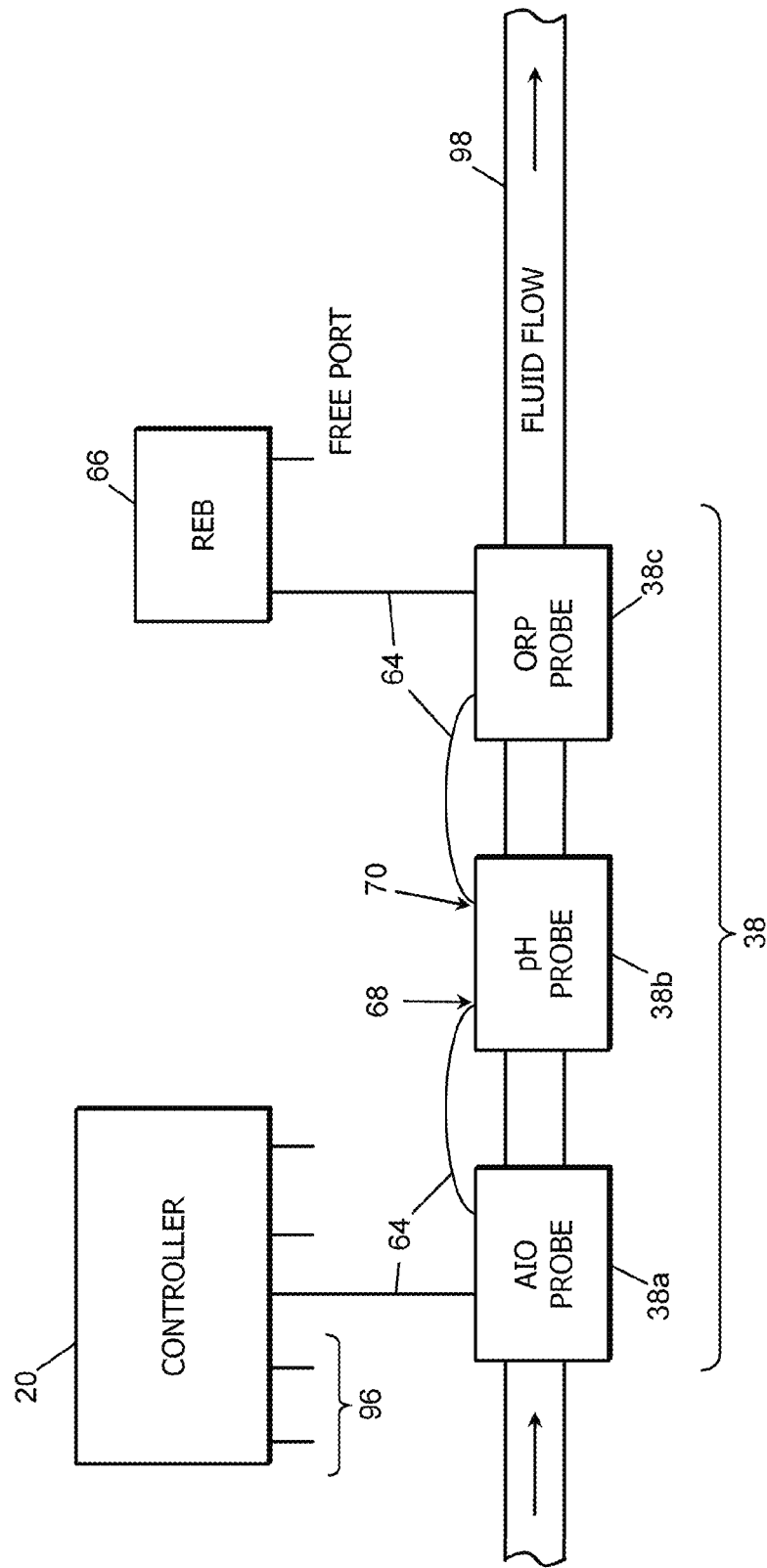
FIG. 5 is a schematic block diagram of a digital network for use with the controller of FIG. 1.

Embodiments of the invention address this need in the art by providing communications between the probes 38 and the controller 20 without requiring direct wiring of probes 38 to the controller 20, thus freeing up valuable space for other typical inputs. As seen in the schematic diagram in FIG. 5, embodiments of the invention employ a network 64 to communicate with the probes. Some embodiments utilize an open source client/server architecture such as MODBUS RTU over serial RS-232 or RS-485 communications protocol. Although, other embodiments be implemented utilizing other architectures or protocols such as CAN, LIN, Profibus and over single or multiple hardware layers. Moreover, wireless networks may be employed between devices on the network and/or between the devices and the controller 20.

Embodiments of the network 64 may be configured such that any new probe 38 may be added to the without the need to open the main controller box or rewire any of the probes 38. Additional devices such as pH or ORP probes, corrosion inhibitors, counters, or expansion devices may also be added on the network 64 without the need to open the main controller box or rewire any of these devices. Once the new probe 38 is connected to the network 64, the probe 38 is automatically added into the menu structure of the controller 20 and automatically configured for immediate use. Utilizing the network 64 allows for up to fifteen instances of each type of each type of probe, where many contemporary controllers are limited to one or possibly two on special occasions. Moreover the number of allowable probes 38 may be controlled through software, in some embodiments, and thus may be expanded past fifteen of each type for some larger installations, or may be reduced to a number lower than fifteen for smaller installations. Thus any limits on the number of types of probes for the controller 20 in these embodiments may be dynamically adjusted through software updates to the controller 20. Additionally, the network 64 may be utilized by the controller 20 to communicate with remote expansion boxes which may be configured to provide additional hardware ports and/or relays to the system allowing for additional expansion without opening the main controller box or rewiring within the box.

Probes 38 connected to the network 64 have individual configurations or "personalities" that may be recognized and supported by the network 64. For example, probes such as an All-In-One Probe 38a that measures temperature, thermal flow (ON/OFF), and conductivity (resistivity of water), or pH or ORP probes may have individual personalities which, when connected to the network 64, are recognized by the controller 20. Additionally, a Relay Expansion Box 66 which adds switched/powered outputs away from the main controller 20 or a Solid State Expansion Box (not shown) for DC (non AC/Wall connections) outputs away from the main controller 20 may also have personalities that are recognized by the controller 20 when these expansion units are connected to the network 64. Still other probes may be added to the system once a personality has been established for the probe with the controller.

In some embodiments, the network 64 is configured such that each probe 38 on the network 64 may be daisy-chained. This configuration allows for the ability to post modify the initial setup of the system with extra probes 38 or expansion boxes 66. Each probe 38 may be configured to have one connection 68 to the network 64, which ultimately connects back to the main controller 20 and one free connection 70 for further expansion and connection to other probes 38 or expansion boxes 66. In some embodiments, the wires of the network 64 may exceed 200 feet in length. In a particular embodiment, the wires may extend approximately 1,000 feet from the controller 20. This would enable a multi-tower configuration of the system utilizing a single controller. In other embodiments of multi-tower configurations, remote expansion boxes 66 may also be used on additional towers.

In some embodiments, each probe 38 or expansion box 66 may be powered by the controller 20 through the network 64. In these embodiments, a hardware switch may be utilized to cycle power to the entire network 64 if a probe 38 loses communication with the main controller 20 or if a probe 38 gives faulty information. The ability to reset the system by cycling power allows for a "self-healing" of the system as the controller 20 reestablishes communications over the network 64 with each of the probes 38 and expansion units 66.

When the system is first powered up, the controller 20 checks for new probes 38 or expansion boxes 66, by communicating with each of the probes 38 and expansion boxes 66 connected to the network 64. In other embodiments, probes 38 and expansion boxes 66 may be configured as plug-n-play and the controller 22 may be alerted in these embodiments each time a probe 38 or expansion box 66 is added to the network 64. In still other embodiments, the load (current or power) on the 24 VDC power supplied over the network may be monitored to determine if a probe 38 or expansion box 66 has been added or removed. In these embodiments, the power consumption of the different types of probes 38 and the expansion box 66 is known and may be used when monitoring the load on the network to determine what type of probe 38 or expansion box 66 has been either added or removed. In some embodiments, each new probe 38 is configured a with a default address for the network 64. The default address and identification information is sent over the network 64 to the controller 20 as the controller 20 establishes communications with the new probe. For example, the default address of the probe 38 may be "00". The additional information sent to the controller 20 may also include the family type of the probe 38 and any default operational parameters of the probe 38. This information is used by the controller 20 to both identify the probe 38 as a new probe on the network 64 as well as identify the personality of the probe 28. In some embodiments, each default address of each personality may be pinged to check for collisions and/or duplicate messages. If that occurs, the controller 20 knows that there is more than one new probe of a particular type and the controller 20 may then take appropriate action, such as notifying a user of a failure in establishing communication.

Figure 6:
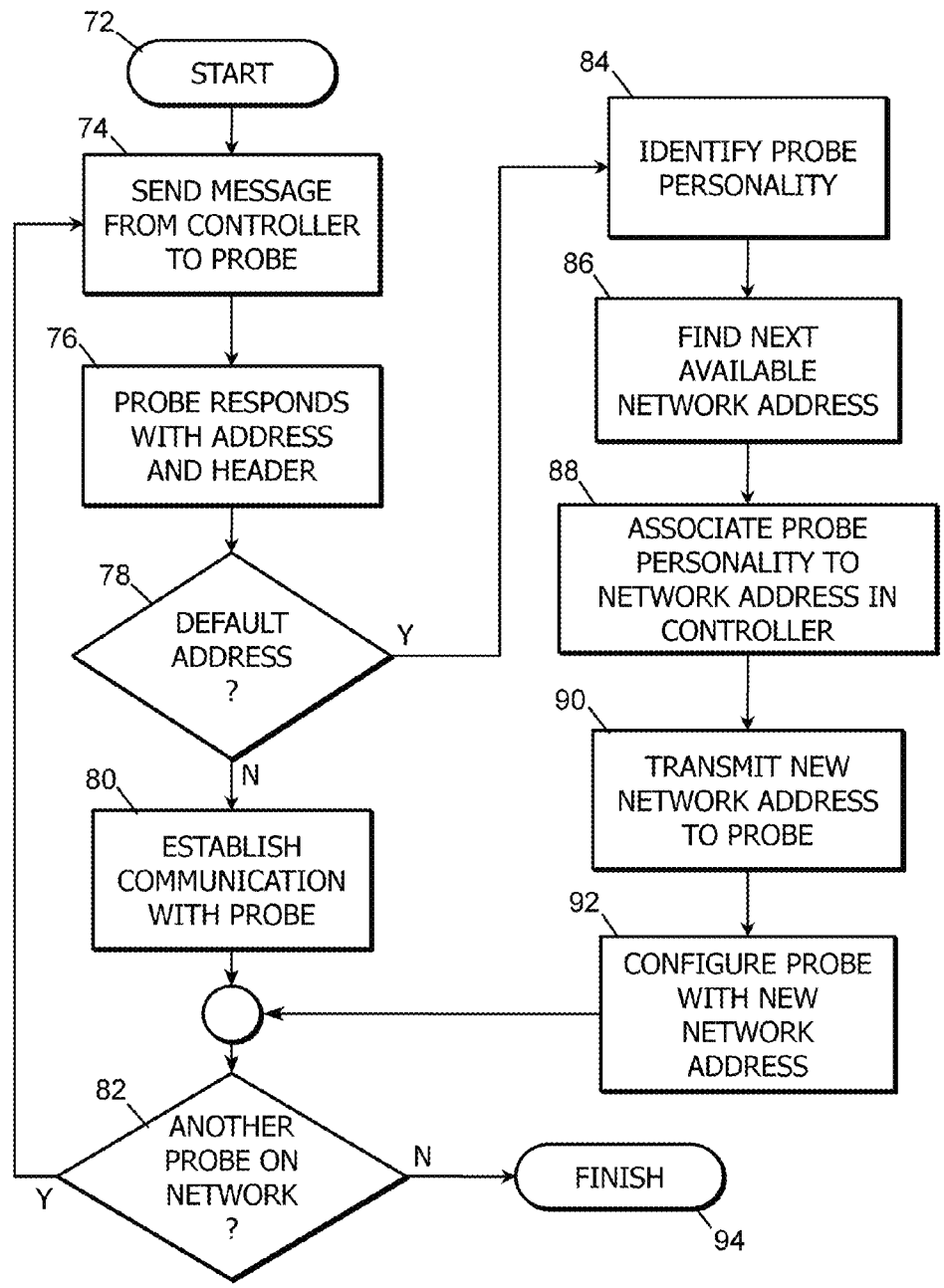
FIG. 6 is a flowchart of an embodiment of probe recognition on the network of FIG. 5.

An embodiment for the probe recognition can be seen in the flowchart in FIG. 6. The process starts at block 72. At block 74, the controller 20 sends a message out on the network to a probe 38. In block 76, the probe 38 responds with its network address and header information to the controller 20. If the probe responds with an assigned address ("No" branch of decision block 78), then the controller 20 establishes communication with the probe 38 in block 80. If there are additional probes 38 ("Yes" branch of decision block 82), then the process continues at block 74.

If, however, a default address is returned to the controller 20 ("Yes" branch of decision block 78), then the controller 20 knows that the probe is a new probe to the network 64. At block 84, the controller 20 uses the header information to identify the personality of the probe 38. If it is a valid probe type, the controller 20 finds the next available network address in block 86 and associates the probe personality with that network address for all further communications at block 88. The new network address is transmitted back to the probe 38 at block 90 and the probe reconfigures its network address with the new address sent by the controller 20. In some embodiments, this network address will now remain with the probe 38 until the probe receives a special reset command instruction, which will cause the network address to be set back to the default address. In other embodiments, the network addresses of the probes may not be permanently changed, but rather assigned at each start up, or if plug-n-play type probes are used, at the time the probe is added to the network 64. After configuring the probe 38, a check is made to determine if there are other probes on the network 64 at block 82. If there are other probes ("Yes" branch of decision block 82), then the process continues at block 74. Otherwise, the process completes at block 94.

In some embodiments, during operation, probes 38 are removed by the controller 20 after a set number of non-replies from a probe. Additionally, in these embodiments, at startup, the controller also removes any expected probes again after a set number of non-replies from the particular probe. Because of the daisy-chain configuration of the network 64, the controller 20 effectively sends all messages to all of the probes in the chain. However, each probe acts only on messages containing its network address similar to standard communications for Ethernet connections.

In some embodiments, the internal network 64 may include multiple chains each originating from an unused network port 96 (FIG. 5) of the controller 20. The ability to use multiple chains allows for easy expansion of the system to include additional probes which would only be limited by the software support and signal loss along the network runs. These limitations could be overcome by upgrades to the controller software to allow for more probes and signal amplifying along the network chains, or even additional network chains from expansion boxes.

In some embodiments, the communication on the network 64 is accomplished through digital communications. The probes 38, monitoring the flow 98 and other characteristics of the fluid, may generate either analog or digital signals representing the characteristics that are being monitored. To accommodate the different signal types, in some embodiments, the actual probe assembly and communications circuitry for the network connection may be in separate housings. In other embodiments they may be contained in the same housing. The communications circuitry may be used to convert any analog signals to digital and further communicate those signals to the controller 20. The separation of the communications circuitry in these embodiments of the probes may also assist in configuring new probes from any number of vendors to be compatible with the controller 20 and network 64.

In addition to transferring data between the controller 20 and the probes 38 over the network 64, the controller may be configured, in some embodiments, to include additional ports to connect to computers or other memory devices, for example. Many contemporary mid to high-end controllers utilize USB devices to facilitate data download, but these ports tend to be standard ports with standard connection and generally require manipulating multiple menus once the device has been connected to the control unit. Conversely, some embodiments of the controller 22 utilize the USB on the Go (USBOTG) configuration. This configuration enables the controller 22 to be connected through mini-USB connection to a computer 32, with the computer 32 being connected as a master rather than a slave as with a standard USB connection. Utilizing the USBOTG configuration, an embedded web server in the controller 20 may assist in allowing the external computer 32 to control the controller 20 and may also assist with making changes to control parameters within the controller 20. Control may be visualized through a Web Browser on the computer 32 which may also be used to upload new software or configuration type data and download data gathered by the controller 20. USBOTG mimics an Internet connection allowing the web browser to access the controller 20. In some embodiments, the web server in the controller 20 may be simultaneously accessed through the mini-USB connection as well as another communication connection. The second connection could be another USB connection on a controller other than the mini-USB, an E-net controller, an RS-232 communication port, or an RS-485 communication port. In still other embodiments, any or all of these ports could access the web server on the controller simultaneously.

The USB ports on the controller 20 may also be used to add other USB compatible devices such as a mouse/keyboard or other peripheral devices. These USB port may be standard slave type configurations with the mini-USB ports having master configurations. In other embodiments, other combinations of master and slave and Standard and mini-USB connections may be utilized. Some USB ports may be configured through the controller to have a one-step data download using any standard USB data stick. Once connected, the controller 20 uses a simple process to download specific or preselected data to the data stick. While the embodiments described above employ USB type connections, other ports with other connections may also be used, including parallel, serial, SCSI, Firewire, etc.

Many contemporary controllers are limited to a set number of relays (AC outputs) near a cooling tower. Due to this limitation, multiple controller 20 boxes for high end applications or multiple towers may be necessary.

Figure 7:
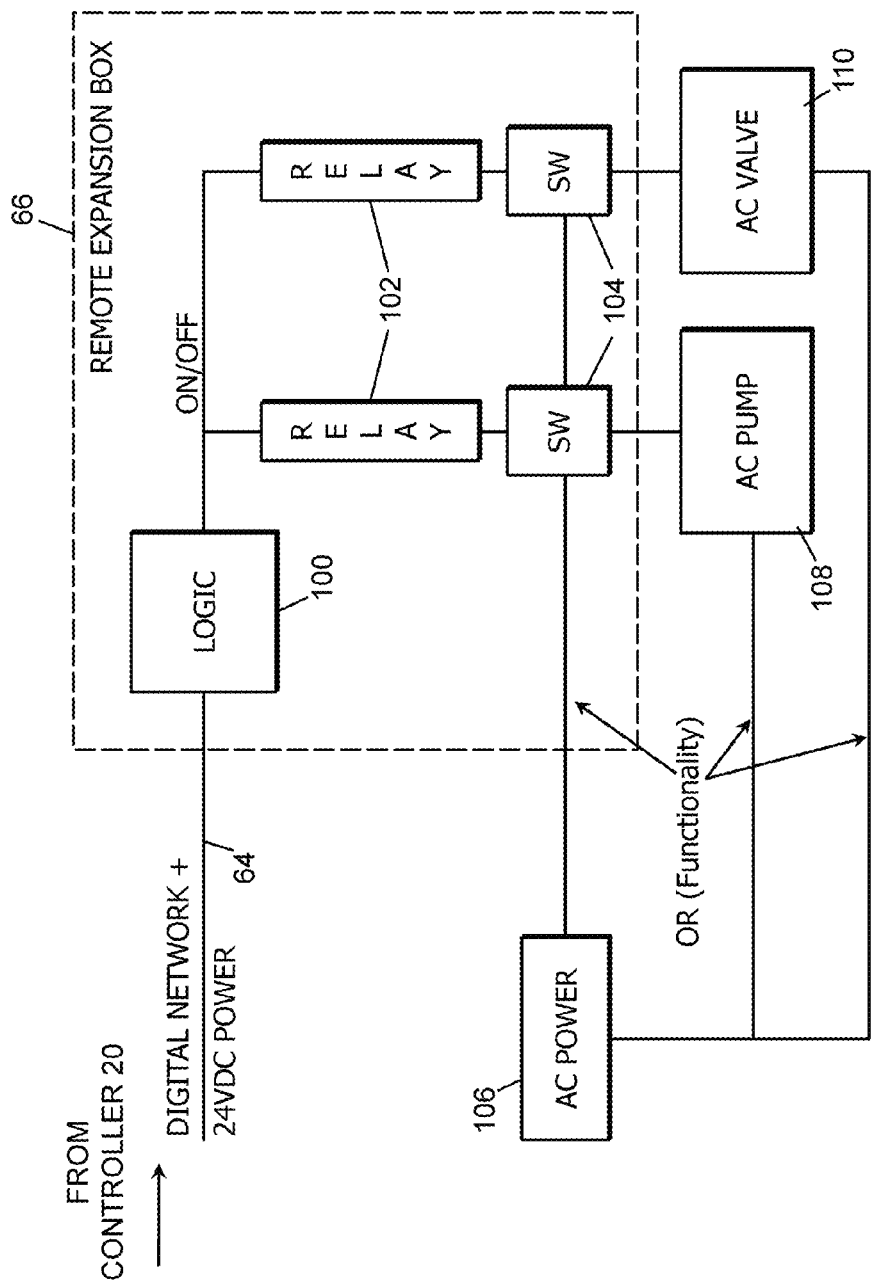
FIG. 7 is a schematic block diagram of a remote expansion box for use with the controller of FIG. 1.
Figure 8:
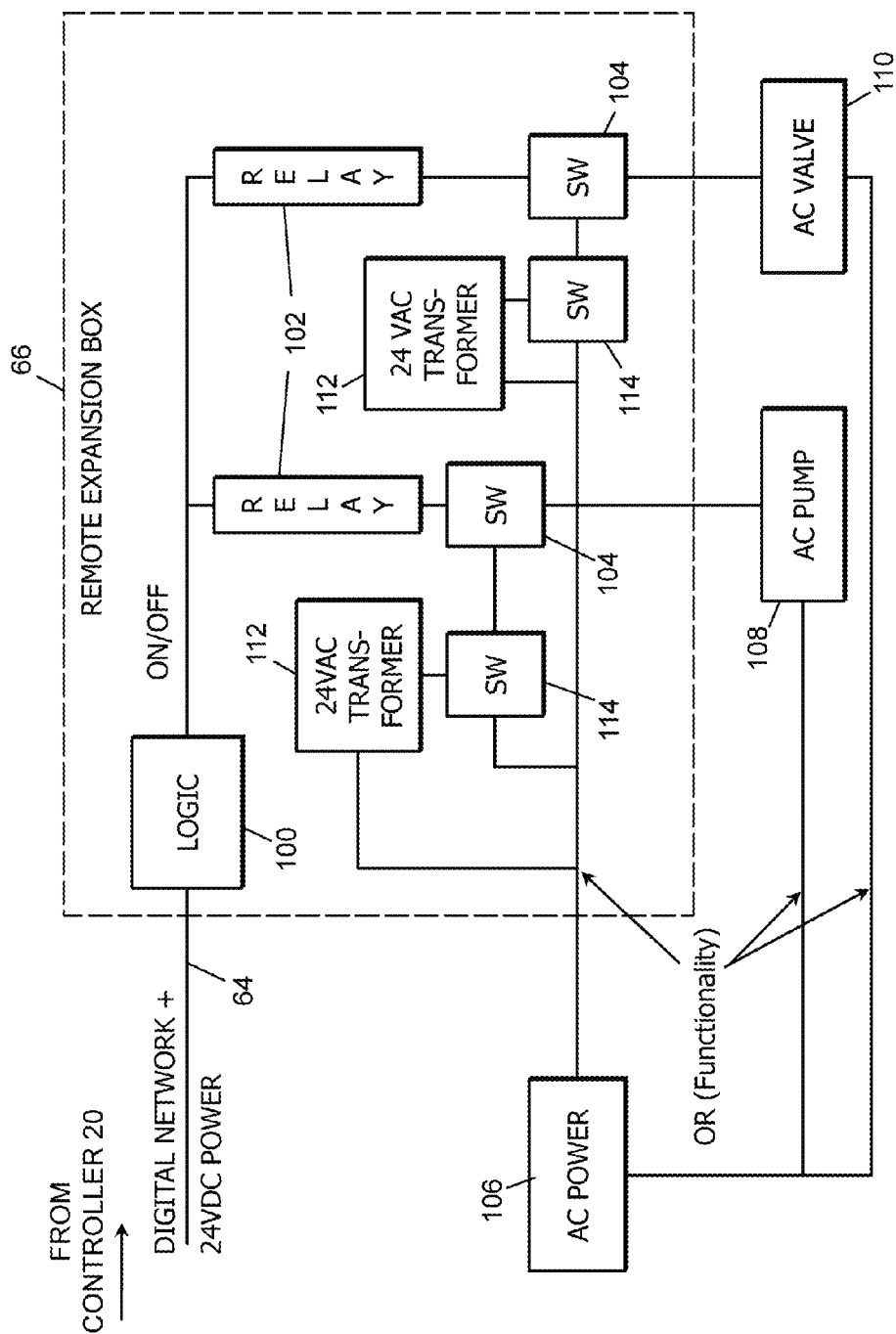
FIG. 8 is a schematic block diagram of an alternate embodiment of the remote expansion box for use with the controller of FIG. 1.

To assist in reducing excessive wiring for long distance relay outputs or multiple controllers, Relay Expansion Boxes (REB) 66, such as those illustrated in FIGS. 7 and 8 may be used. Embodiments of the REB 66 may be configured for both wet or dry operation. As seen in FIGS. 7 and 8, if the REB 66 is configured for dry operation, the power leads between the AC power and the auxiliary loads, such as AC pump 108 and AC valve 110 may be connected as part of the installation. If the REB 66 is configured for wet operation, these power leads are not installed. Rather, power is delivered via switches 104 from relays 102. In other embodiments of the REB 66, the REB 66 may be configured to dynamically convert between wet and dry operation using a DPDT switch as illustrated in FIG. 4. The REB 66 communicates over the network 64 with the controller 20. Data packets are sent out from the controller 20 and received by the REB 66 to turn off and on relays 102 within the REB 66 as well as control a status LED (not shown) which may be driven by logic circuit 100 within the REB 66. REBs 66 may contain any number of relays. For example, in one embodiment, the REB 66 may contain two relays 102 as illustrated in FIGS. 7 and 8. In another embodiment, the REB 66 may contain four relays. An alarm status may also be sent from the controller 20 that illuminates the corresponding LED (usually red) for a particular realy that an issue has been found.

Additionally, some controllers include 24 VAC outputs used as a dedicated output for boiler treatment applications, for example. As specifically seen in the embodiment of the REB 66 in FIG. 8, the REB 66 may contain a simple switch 114 and a transformer 112 allowing the REB 66 relay output to switch between 120 VAC from the power source 106, for example, and 24 VAC from the transformer 112 secondary.

Figure 9:
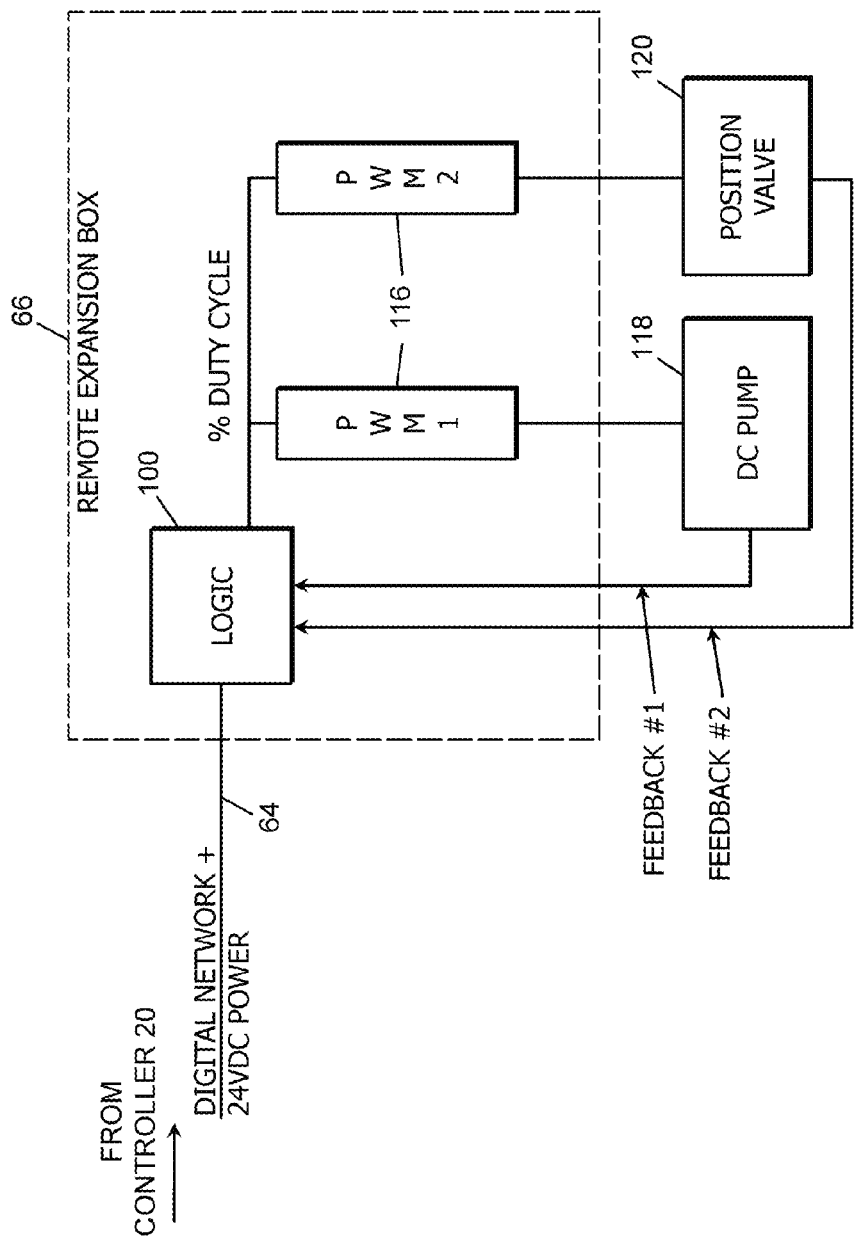
FIG. 9 is a schematic block diagram of an alternate embodiment of the remote expansion box for use with the controller of FIG. 1.

Further, and as seen in FIG. 9, some embodiments of the REB 66 provide 24 VDC PWM outputs with feedback control. This embodiment may be added as a new personality on the network 64 in addition to the general REB 66 as discussed above. Embodiments of the REB 66 may expand out through from just Relays to 24 VDC outputs at certain duty cycles (PWM) to and provide feedback assuming we knew the parameters of the powered 24 VDC unit. Using relay expansion box, only one controller needed for multiple towers. Also, since boiler treatment generally requires 24 VAC ball vales, there can be a simple switch and step down transformer (110 VAC to 24 VAC) to allow for wet operation in similar embodiments of the REB 66. Any feedback loops are local to the REB 66.

Generally, contemporary controllers require many steps to program even simple water treatment modes. A traditional set up generally starts with an unprogrammed system and works through each of the menus or other display screens in order to set up the system from scratch. This can be time consuming and also confusing in some situations where parameters may be presented that may not apply to a particular treatment mode. Embodiments of the invention assist in overcoming these drawbacks with programming treatment modes by providing pre-programmed modes that automatically provide default settings as well as preselect inputs. These pre-programmed modes essentially eliminate the need for time consuming setup in multiple screens.

Additionally, the pre-programmed modes may assist in eliminating screen clutter by not displaying modes that are not in use. This may assist in avoiding confusion as to what to do with unused fields for certain modes that may not be in use. Moreover, special user modes may also be available to set up specialized functionality or requirements. Data entered for these user modes are saved settings that can be recalled at any time, for example for a mode that changes per session or time of day. Furthermore, any of the pre-programmed canned modes may be copied into a user mode as a starting point for modifications.

Any programming of the controllers in contemporary systems is traditionally performed on the panel on the front of the controllers. Generally, the controllers have limited information displayed on the screen, due solely to the limited amount of space for any display. Embodiments of the invention assist in overcoming these limitations by providing a larger screen and a multi-column menu structure, which assists in maximizing information being displayed to an operator.

Figure 10:
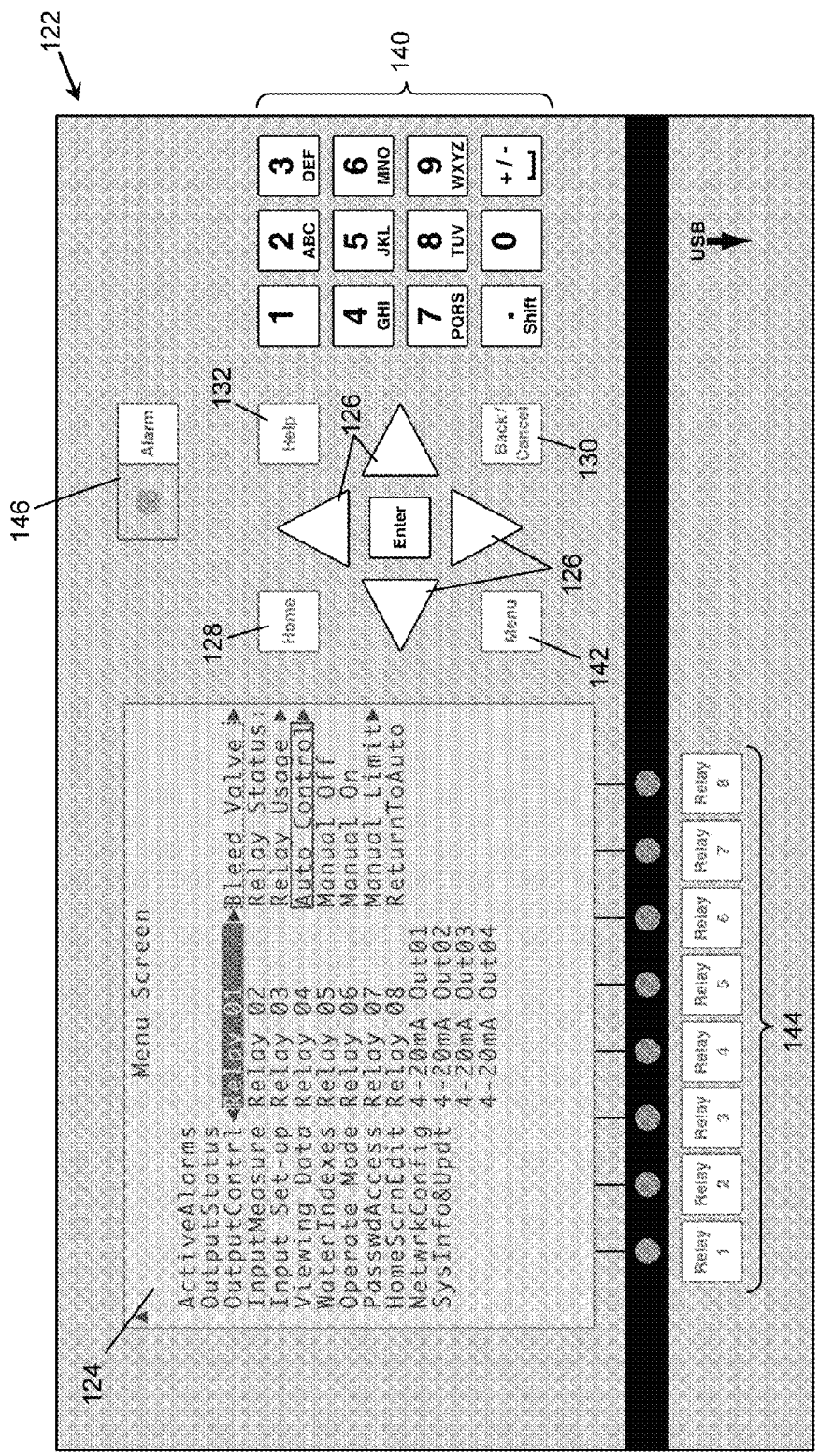
FIG. 10 is a representation of a sample display consistent with embodiments of the controller in FIG. 1.

An example of specific embodiment of a user interface 122 for the controller 20 may be seen in the representation in FIG. 10. The menu/display screen 124 display both current information as well as any menus needed to set, reset, or adjust the system. Navigation of the interface may be accomplished with the 4-way arrow keys 126 and programmed home 128 and back buttons 130. These keys assist in eliminating what can be time consuming input, which could be lost by inadvertently hitting the incorrect key. The Help button 132 provides useful information at any point while entering/retrieving information. Embodiments of the invention have been configured with context sensitive help. In these embodiments, when the help key 132 is selected, the help screen for the current function is displayed on the menu/display screen 124, rather than being sent to a table of contents to manually navigate the help system.

Due to the limited display area, complicated menu systems of contemporary system can be challenging to navigate. Embodiments of the invention assist in overcoming these challenges by providing a hierarchical menu system that is configured for the limited display area 124. As seen in the example diagram in FIG. 11, a main menu structure 134 is displayed in a first column on display 124 with a number of items. The main menu 134 may be navigated by arrow keys 126 to select the appropriate menu item 135 in the main menu 134 in FIG. 11. Based on the main-menu selection, a sub-menu 136 corresponding the selection 135 from the main menu is displayed in a second column on the display 126. Again this sub-menu may be navigated using the arrow keys 126 and to again select an appropriate menu item 137. The display 124 is again updated to include a third column with sub-menu 138. This continues until the proper parameter or command is reached in the menu structure with the columns of the menus shifting to the left, always displaying three columns. Any input for parameters or other commands may be accomplished with keypad 140. In some embodiments, an audit trail may be displayed along the top of the display 124 as an operator navigates through the menus. Additionally, selecting the Menu button 142 may return the operator to the top main menu 134 in some embodiments.

Figure 11:
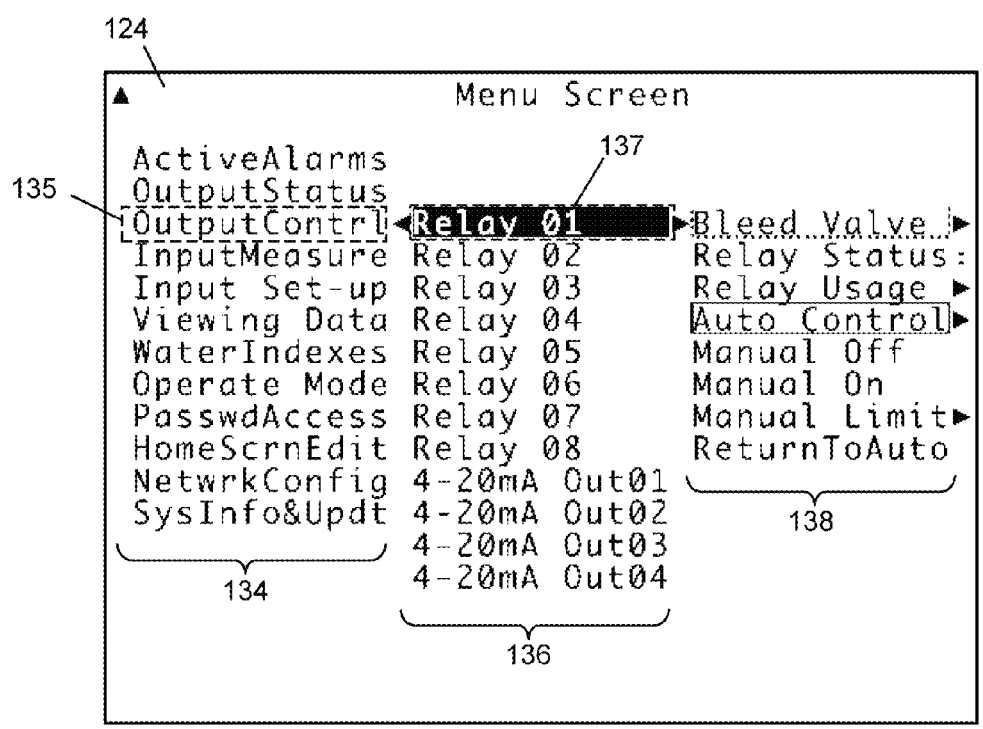
FIG. 11 is a graphical representation of a menu structure for use with the display of FIG. 10.

Some embodiments also provide quick access buttons as part of the user interface to also assist in reducing the complexity of some contemporary menu system. Referring again to the example user interface 122 in FIG. 10, relay buttons 144 may be provided for quick access to program a particular relay. Additionally specialized buttons like an alarm button 146 may automatically navigate the menu system and take the operator directly to the menu containing the active alarm as well as explaining the cause of the alarming. And as described above, the context sensitive help, activated by the help button 132, takes the operator into the help system to a location corresponding to the operator's specific actions. One of ordinary skill in the art will recognize that the user interface described in relation to FIGS. 10 and 11 is but only one example of one implementation of the user interface. Other embodiments may employ all or parts of user interface 122 with other buttons, menu systems, or input devices. Furthermore, as discussed above, interface to the controller 20 may be accomplished on a computer 32 connected to the controller 20, for example through a web interface.

As described above, the controller 20 communicates over network 64 with a number of different types of probes to obtain flow data and data related to properties of the fluid flowing in the system. Contemporary systems require multiple probes to obtain data related to conductivity (resistivity), temperature, and flow (on/off) of the incoming fluid in the system. Multiple probes require multiple setups and calibration by the controller 20. Additionally, the flow switch also consumes an input reducing the number of inputs left for other devices.

Figure 12A:
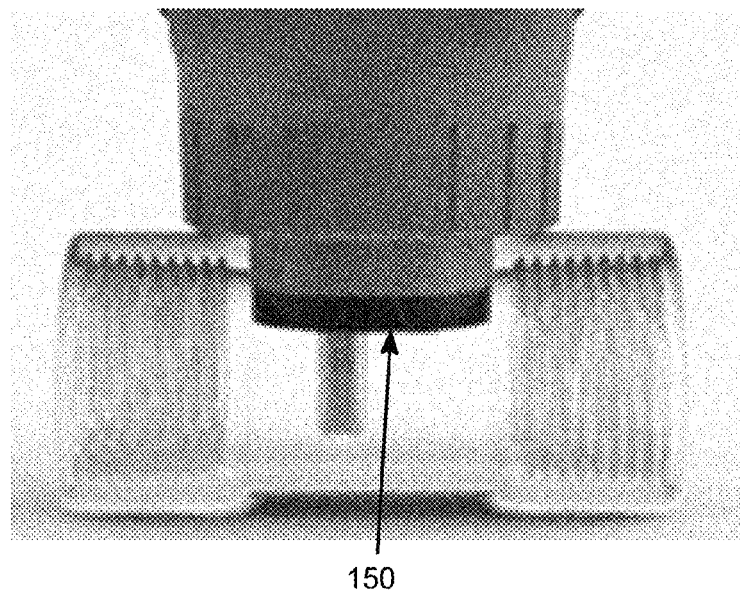
FIG. 12A is a side view of a portion of an All-in-One probe consistent with embodiments of the invention.
Figure 12B:
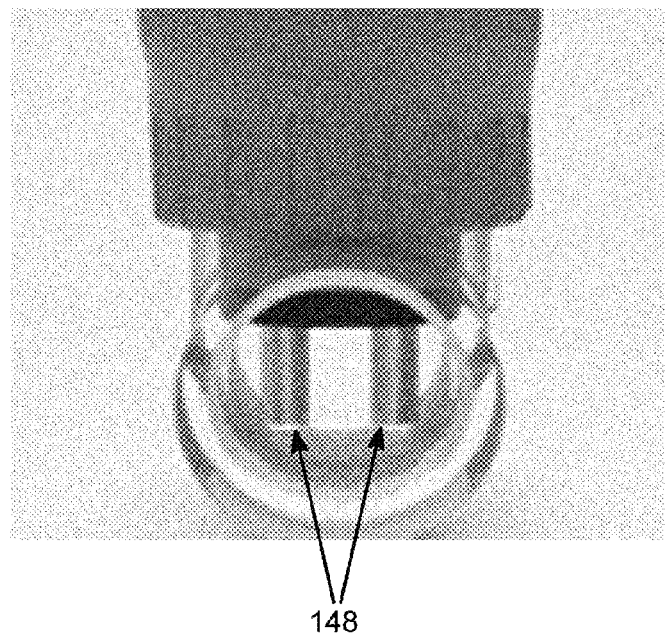
FIG. 12B is another side view of the portion of the All-in-One probe in FIG. 12A.
Figure 13A:
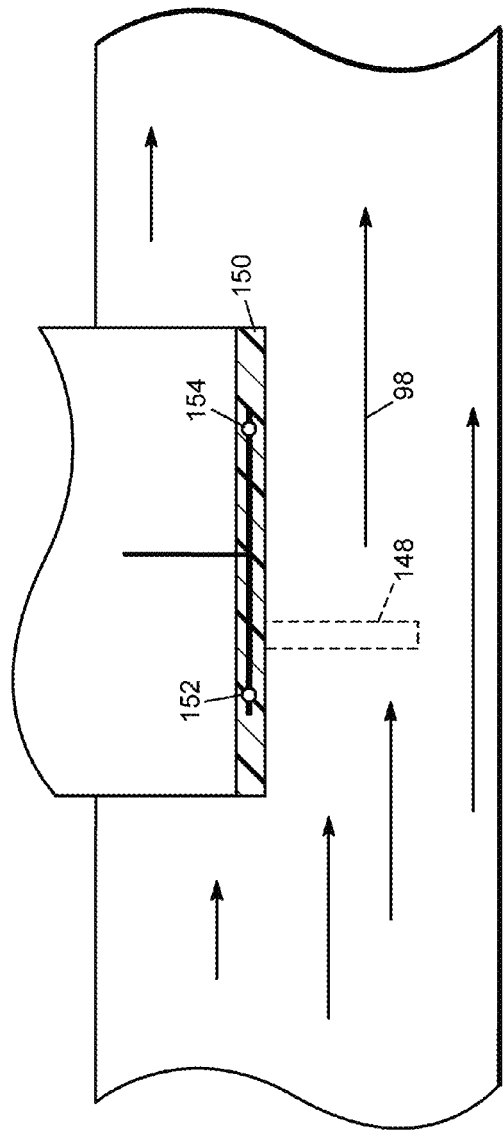
FIG. 13A is a schematic block diagram illustrating positions of temperature probes in the All-in-One probe in FIG. 12A
Figure 13B:
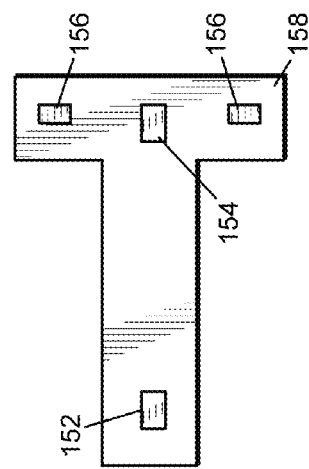
FIG. 13B is a schematic block diagram of a circuit board containing the temperature components for the All-in-One probe of FIG. 12A.

In order to reduce the additional wiring and plumbing of pipes for multiple sensors, embodiments of the invention may utilize an All-In-One probe (AIO probe). The AIO probe is configured to measure temperature, conductivity, and flow (On/Off) of the fluid in the system. As seen in the portion of the AIO probe illustrated in FIGS. 12A and 12B, conductivity (resistivity) probes 148 are positioned in the fluid flow 98 path. Because conductivity is measured in 1/Ohms, which is nonlinear and would generally require a lookup table. To avoid using a look-up table, some embodiments of the probe have isolation from the fluid flow and uses a timer/counter and fits the nonlinear conductivity into a straight line (y=mx+b) where y is the conductivity, m is a predefined slope given circuit parameters of the measurement circuit, b is the y-intercept given circuit parameters of the measurement circuit, and x is the accumulated pulses from the timer over a certain predetermined time period. The counts may then be easily correlated to conductivity values, where the higher the counts, the higher the conductivity. In some embodiments, these probes 148 may be constructed from stainless steel or other material that is resistive to the potentially corrosive environment generated by the fluid flow 98.

In some embodiments, the temperature and flow measurement sensors are encased in thermally conductive plastic 150, such as those offered by Cool Polymers, Inc of North Kingston, R.I. or PolyOne Corporation of Avon Lake, Ohio, which contacts the fluid flow 98, though in other embodiments, the temperature and flow measurement sensors may be encased in other corrosion resistant materials. Fluid flow is determined with the use of two temperature sensors 152, 154. One temperature sensor 152 is configured to measure the baseline (inline) temperature of the fluid flow 98. This baseline temperature may be reported back to the controller 20 over the network 64. The second temperature sensor 154 is heated to a steady state temperature above the inline. In some embodiments, heater elements 156 may be positioned near the second temperature sensor 156 in order to heat the temperature sensor above the inline temperature. The temperature sensors 152, 154 and heater elements 156 may be implemented on a circuit board 158 which may then be embedded in the thermally conductive plastic 150. In other embodiments, a locking mechanism may be employed, which holds the circuit board and forms a gap between the circuit board and the thermally conductive plastic 150. This gap may then be filled with a thermally conductive paste, gel, or other thermally conductive material. In still other embodiments, the elements may be directly embedded in the thermally conductive plastic 150.

Figure 14:
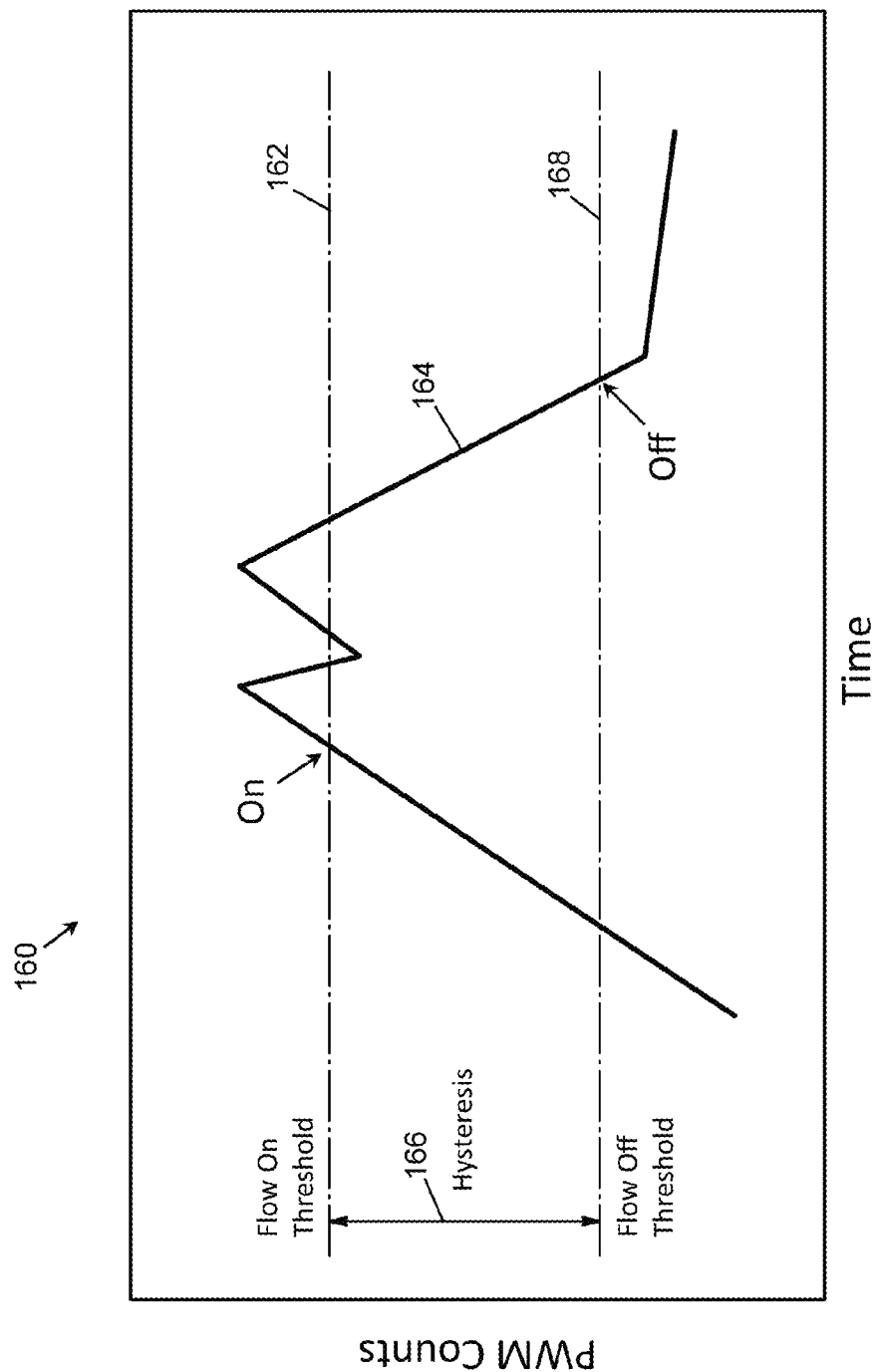
FIG. 14 is a graph illustrating threshold values for the All-in-One probe of FIG. 12A.

In some embodiments, pulse width modulation (PWM) is utilized to drive the heater elements 156 in order to keep the temperature difference constant between the two temperature sensors 152, 154 essentially constant. In the event of no water flowing, PWM counts are lower. In the event of water flowing, the PWM counts are higher. Based on the PWM counts, flow events ON or OFF may be determined. As illustrated in the graph 160 in FIG. 14, when the PWM counts exceed a determined threshold value 162, a FLOW ON event may be registered. As the PWM counts change in response to changes in flow rate as represented by the curve 164 in FIG. 14, the PWM count may drop below the on threshold value. However, due to an inherent hysteresis 166 in some embodiments, a FLOW OFF event may not be registered until the PWM count drops below a second threshold value 168.

Figure 15:
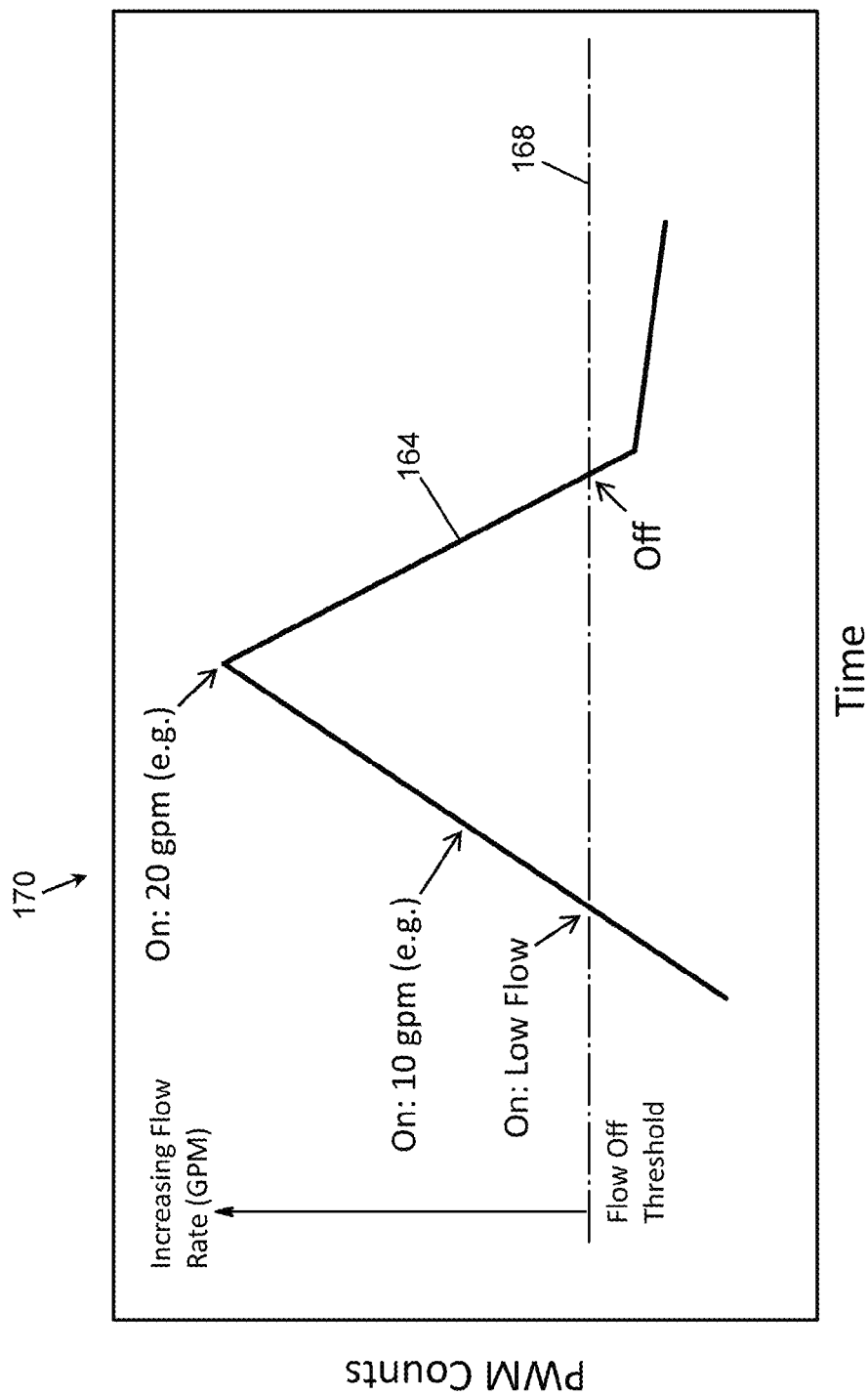
FIG. 15 is a graph illustrating an out correlation to flow rate of the All-in-One probe of FIG. 12A.

During initial set up of the probes, the temperature sensors may need to be calibrated to overcome any error inherent to the sensors. The temperature difference between the first and second temperature sensors 152, 154 may be a two degree difference in some embodiments, though other embodiments may maintain other temperature differences. Correlating the PWM counts to flow rate as seen in the graph 170 in FIG. 15 assists in detecting a larger flow range from a trickle flow to a larger flow, which may be a more accurate detection than some contemporary flow rate sensors that measure flow in gallons/minute.

The above algorithm when coupled with the conductivity probes 148 allows the AIO probe to measure conductivity (resistivity), flow, and temperature of the fluid flow 98 using just one probe. The use of stainless steel and the high thermal conductivity plastic also assist in maintaining accurate readings in a potentially corrosive environment.

In addition to the All-In-One probe discussed above, the controller 20 communicates over network 64 with a number of other different types of probes to obtain flow data and data related to properties of the fluid flowing in the system. Some of these probes are pH, oxidation reduction potential ("ORP"), or dissolved oxygen ("DO") type probes. Many contemporary versions of these probes require a separate grounding wire to be used with the probe and in many configurations, this grounding wire must be run back to the controller to be connected to a common ground.

Figure 16:
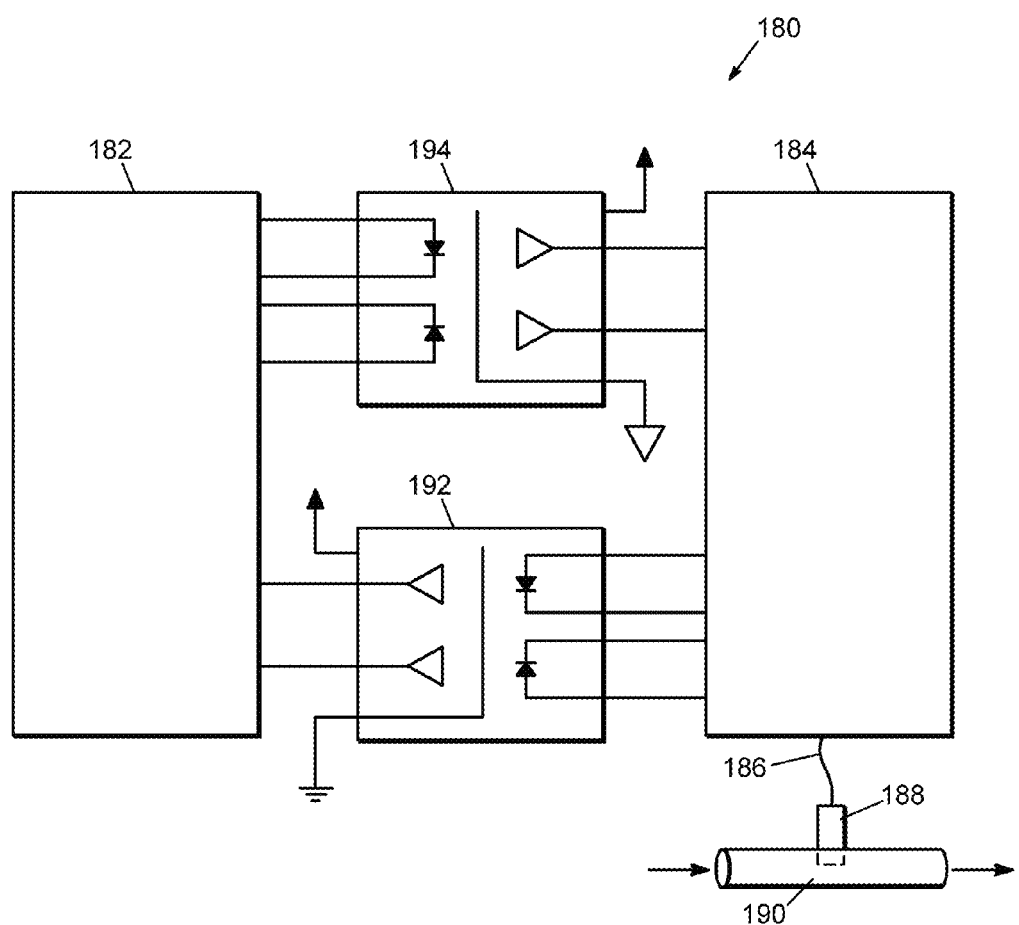
FIG. 16 is a schematic block diagram of a probe configuration for use with the controller of FIG. 1.

To avoid the need for this additional ground wire, embodiments of the invention may utilize a probe 180, such as that illustrated in the schematic block diagram of FIG. 16. Probe 180 may be configured as a pH probe, an ORP probe, or a DO probe. Probe 180 communicates through digital circuitry 182 over the network 64 back to controller 20. Probe electronics 184 receive analog signals from a probe member 188, through connector 186, which is in contact with the fluid flow through a conduit 190. For convenience, the connector 186 may be any type of connector, such as a BNC connector, for easy attachment and removal of the probe member 188. The probe electronics 184 may utilize a high impedance input to receive the analog signals from the probe member 188. These analog signals may then be converted to digital signals by the probe electronics.

The digital circuitry 182 and probe electronics 184 may be isolated by employing optical isolators 192 and 194. The digital signals generated by the probe electronics 184 may be transmitted over the optical isolators to the digital circuitry 182 for further transmission to the controller 20 over network 64. In some embodiments, the digital circuitry 182 may utilize an I²C bus to receive and decode the digital signals from the isolation circuits 192, 194. In other embodiments, other circuit configurations and/or digital hardware may be utilized. Unfortunately it is not so simple to provide opto-isolation of the I²C-bus because the I²C clock and data signals are both bidirectional signals while opto-couplers can only handle unidirectional signals. The challenge to optically isolate the I²C-bus has always been to effectively split the bidirectional I²C signals into unidirectional data streams and reconnect them again. In the illustrated embodiment, the bidirectional data stream has been split into the two unidirectional data streams through isolation circuits 192 and 194. The digital electronics 182 combine these two unidirectional streams back into a bidirectional stream on the I²C-bus for further transmission over the network.

Transfer rate across the optical isolation circuits 192, 194 is dependent on the saturation of the photo-transistor in the opto-coupler. Saturation may result in long turn-off delays caused by charge storage effects, thus affecting the total switching delays which may be upwards of approximately 50 μs. These delays contribute in limiting the bus speed which may be around a 5 kHz clock rate. In order to achieve higher bus speeds, the LED drive current may be increased which in turn may reduce the turn-on delay of an opto-coupler. But, the increased drive current may also result in deeper saturation of the photo-transistor, increasing the turn off delay and increasing the total signal delays. In some embodiments, to reduce the turn-off delay and assist in preventing saturation of the photo-transistor, a Schottky diode clamp may be applied between the collector and base of the photo-transistor. Other embodiments may employ feedback to regulate or limit current in the photo-transistor to assist in preventing the transistor from becoming saturated and operating in a linear mode.

By using the optical isolators, the probe electronics 184 do not need to share a common ground with the digital electronics 182 used to communicate the probe 180 signals to the controller 20 over the network 64. Instead, the voltage of the probe 180 is allowed to float, while still communicating digital signals representative of the probe output to the controller 20.

While the above embodiments relate to pH, ORP, and/or DO probes, the digital electronics 182 may be used with any type of probe to assist in providing data from that probe over the network 64 to controller 20. Probes providing analog outputs need only be configured to convert the analog to digital and then convey that information to the digital electronics 182 for transmission over the network. Isolation between probe electronics 184 and the digital electronics 182 may be accomplished via the optical isolators 192, 194 as discussed above, or may employ other isolation methods known in the art.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A system for water treatment comprising:
a controller;
a network;
a sensor communicating over the network with the controller, the sensor including:
a housing having a bottom portion formed from a thermally conductive material, wherein the bottom portion of the housing includes an exterior surface in contact with a flow path of a fluid and an interior surface;
a first probe extending from the exterior surface and into the flow path of the fluid;
a second probe extending from the exterior surface and into the flow path of the fluid, the second probe spaced from the first probe;
a first circuit electrically connected to the first and second probes and configured to measure a resistivity between the first and second probes and determine a conductivity from the measured resistivity;
a circuit board including a longitudinal portion having a first end and a second end, and a crosswise portion having a first end, a second end, and a midpoint between the first and second ends, wherein the second end of the longitudinal portion joins the crosswise portion at the midpoint to form a T-shape, the circuit board being oriented so that the longitudinal portion is aligned with the flow path of the fluid;
a first temperature sensor mounted proximate to the first end of the longitudinal portion of the circuit board, the first temperature sensor thermally coupled to the interior surface and configured to determine a temperature of the fluid via thermal conduction between the exterior surface and the interior surface through the bottom portion of the housing;
a second temperature sensor mounted proximate to the midpoint of the crosswise portion of the circuit board, the second temperature sensor thermally coupled to the interior surface and spaced from the first temperature sensor;
a heat source including a first heater element mounted proximate the first end of the crosswise portion of the circuit board and a second heater element mounted proximate the second end of the crosswise portion of the circuit board, the heat source configured to elevate a temperature determined by the second temperature sensor, and wherein the temperature determined by the second temperature sensor is maintained at a temperature above the determined temperature of the fluid;
a second circuit configured to adjust the heat source and determine a flow rate of the fluid based on the adjustment; and
communication circuitry configured to communicate the conductivity of the fluid, the temperature of the fluid, and the flow rate of the fluid to the controller.

2. The system of claim 1, wherein the temperature determined by the second temperature sensor is maintained at a set difference above the temperature of the fluid.

3. The system of claim 2 wherein the second circuit adjusts the heat source by:
applying a pulse-width-modulation (PWM) signal to the heat source;
in response to a difference in temperature between the temperature of the fluid and the temperature determined by the second temperature sensor being less than the set difference, increasing a number of PWM counts applied to the heat source; and
in response to the difference in temperature between the temperature of the fluid and the temperature determined by the second temperature sensor being greater than the set difference, decreasing the number of PWM counts applied to the heat source.

4. The system of claim 3, wherein the second circuit determines the flow rate of the fluid by:
correlating the number of PWM counts applied to the heat source to the flow rate of the fluid; and
calculating the flow rate based on the number of PWM counts applied to the heat source.

5. The system of claim 1, wherein the communication circuitry communicates the conductivity of the fluid, the temperature of the fluid, and the flow rate of the fluid to the controller digitally.

6. The system of claim 1, wherein the bottom portion of the housing is comprised of thermally conductive plastic.

7. The system of claim 1 further comprising:
a locking mechanism configured to position the circuit board proximate to the bottom portion of the housing so that a gap is defined between the circuit board and the interior surface; and
a viscous thermally conductive material in the gap so that the circuit board is thermally coupled to the interior surface by the viscous thermally conductive material.

8. A sensor for use in water treatment comprising:
a housing having a bottom portion formed from a thermally conductive material, wherein the bottom portion of the housing includes an exterior surface in contact with a flow path of a fluid and an interior surface;
a first probe extending from the exterior surface and into the flow path of the fluid;
a second probe extending from the exterior surface and into the flow path of the fluid, the second probe spaced from the first probe;
a first circuit electrically connected to the first and second probes and configured to measure a resistivity between the first and second probes and determine a conductivity from the measured resistivity;

a circuit board including a longitudinal portion having a first end and a second end, and a crosswise portion having a first end, a second end, and a midpoint between the first and second ends, wherein the second end of the longitudinal portion joins the crosswise portion at the midpoint to form a T-shape, the circuit board being oriented so that the longitudinal portion is aligned with the flow path of the fluid;

a first temperature sensor mounted proximate to the first end of the longitudinal portion of the circuit board, the first temperature sensor thermally coupled to the interior surface and configured to determine a temperature of the fluid via thermal conduction between the exterior surface and the interior surface through the thermally conductive material of the bottom portion of the housing;

a second temperature sensor mounted proximate to the midpoint of the crosswise portion of the circuit board, the second temperature sensor thermally coupled to the interior surface and spaced from the first temperature sensor;

a heat source including a first heater element mounted proximate the first end of the crosswise portion of the circuit board and a second heater element mounted proximate the second end of the crosswise portion of the circuit board, the heat source configured to elevate a temperature determined by the second temperature sensor, wherein the temperature determined by the second temperature sensor is maintained at a temperature above the determined temperature of the fluid;

a second circuit configured to adjust the heat source and determine a flow rate of the fluid based on the adjustment; and communication circuitry configured to communicate the conductivity of the fluid, the temperature of the fluid, and the flow rate of the fluid to a controller.

9. The sensor of claim 8, wherein the temperature determined by the second temperature sensor is maintained at a set difference above the temperature of the fluid.

10. The sensor of claim 9, wherein the second circuit adjusts the heat source by:
applying a pulse-width-modulation (PWM) signal to the heat source;
in response to a difference in temperature between the temperature of the fluid and the temperature determined by the second temperature sensor being less than the set difference, increasing a number of PWM counts applied to the heat source; and
in response to the difference in temperature between the temperature of the fluid and the temperature determined by the second temperature sensor being greater than the set difference, decreasing the number of PWM counts applied to the heat source.

11. The sensor of claim 10, wherein the second circuit determines the flow rate of the fluid by:
correlating the number of PWM counts applied to the heat source to the flow rate of the fluid; and
calculating the flow rate based on the number of PWM counts applied to the heat source.

12. The sensor of claim 11, wherein a FLOW OFF event is determined when the number of PWM counts applied to the heat source drop below a first predetermined threshold, and wherein a FLOW ON event is determined when the number of PWM counts applied to the heat source exceed a second predetermined threshold.

13. The sensor of claim 8, wherein the bottom portion of the housing is comprised of thermally conductive plastic.

14. The sensor of claim 8 further comprising:
a locking mechanism configured to position the circuit board proximate to the bottom portion of the housing so that a gap is defined between the circuit board and the interior surface; and
a viscous thermally conductive material in the gap so that the circuit board is thermally coupled to the interior surface by the viscous thermally conductive material.

15. A sensor for use in water treatment comprising:
a housing having a bottom portion formed from a thermally conductive material, wherein the bottom portion of the housing includes an exterior surface in contact with a flow path of a fluid and an interior surface;

a circuit board including a longitudinal portion having a first end and a second end, and a crosswise portion having a first end, a second end, and a midpoint between the first and second ends, wherein the second end of the longitudinal portion joins the crosswise portion at the midpoint to form a T-shape, the circuit board being oriented so that the longitudinal portion is aligned with the flow path of the fluid;

a first temperature sensor mounted proximate to the first end of the longitudinal portion of the circuit board, the first temperature sensor thermally coupled to the interior surface and configured to determine a temperature of the fluid via thermal conduction between the exterior surface and the interior surface through the thermally conductive material of the bottom portion of the housing;

a second temperature sensor mounted proximate to the midpoint of the crosswise portion of the circuit board, the second temperature sensor thermally coupled to the interior surface and spaced from the first temperature sensor;

a heat source including a first heater element mounted proximate the first end of the crosswise portion of the circuit board and a second heater element mounted proximate the second end of the crosswise portion of the circuit board, the heat source configured to elevate a temperature determined by the second temperature sensor, and wherein the temperature determined by the second temperature sensor is maintained at a temperature above the determined temperature of the fluid;

a circuit configured to adjust the heat source and determine a flow rate of the fluid based on the adjustment; and communication circuitry configured to communicate the temperature of the fluid and the flow rate of the fluid to a controller.

16. The sensor of claim 15, wherein the temperature determined by the second temperature sensor is maintained at a set difference above the temperature of the fluid.

17. The sensor of claim 16, wherein the circuit adjusts the heat source by:
applying a pulse-width-modulation (PWM) signal to the heat source;
in response to a difference in temperature between the temperature of the fluid and the temperature determined by the second temperature sensor being less than the set difference, increasing a number of PWM counts applied to the heat source; and
in response to the difference in temperature between the temperature of the fluid and the temperature determined by the second temperature sensor being greater than the set difference, decreasing the number of PWM counts applied to the heat source.

18. The sensor of claim 17, wherein the circuit determines the flow rate of the fluid by:
  correlating the number of PWM counts applied to the heat source to the flow rate of the fluid; and
  calculating the flow rate based on the number of PWM counts applied to the heat source.

19. The sensor of claim 18, wherein a FLOW OFF event is determined when the number of PWM counts applied to the heat source drop below a first predetermined threshold, and wherein a FLOW ON event is determined when the number of PWM counts applied to the heat source exceed a second predetermined threshold.

20. The sensor of claim 15 further comprising:
  a circuit board positioned proximate to the bottom portion of the housing and held by a locking mechanism configured to position the circuit board proximate to the bottom portion of the housing so that a gap is defined between the circuit board and the interior surface; and
  a viscous thermally conductive material in the gap so that the circuit board is thermally coupled to the interior surface by the viscous thermally conductive material.

* * * * *

UNITED STATES PATENT AND TRADEMARK OFFICE
CERTIFICATE OF CORRECTION

PATENT NO. : 8,926,834 B2
APPLICATION NO. : 12/906254
DATED : January 6, 2015
INVENTOR(S) : Stephen J. West et al.

Page 1 of 1

It is certified that error appears in the above-identified patent and that said Letters Patent is hereby corrected as shown below:

In the Claims

Claim 12, Column 17, line 64, "drop below" should be ---drops below---.

Claim 12, Column 17, line 66, "exceed a second" should be ---exceeds a second---.

Claim 19, Column 19, line 9, "drop below" should be ---drops below---.

Claim 19, Column 19, line 11, "exceed a second" should be ---exceeds a second---.

Signed and Sealed this
Fifteenth Day of September, 2015

Michelle K. Lee
*Director of the United States Patent and Trademark Office*